(12) United States Patent
Sun et al.

(10) Patent No.: US 11,722,205 B2
(45) Date of Patent: *Aug. 8, 2023

(54) METHOD AND DEVICE FOR SELECTING THE BEAM INDICATION INFORMATION FROM A NETWORK NODE WHEN RECEIVING

(71) Applicant: VIVO MOBILE COMMUNICATION CO., LTD., Chang'an Dongguan (CN)

(72) Inventors: Peng Sun, Chang'an Dongguan (CN); Xueming Pan, Chang'an Dongguan (CN); Yang Song, Chang'an Dongguan (CN); Yu Yang, Chang'an Dongguan (CN); Xiaodong Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,143

(22) Filed: May 13, 2022

(65) Prior Publication Data

US 2022/0271823 A1   Aug. 25, 2022

Related U.S. Application Data

(63) Continuation of application No. 16/637,700, filed as application No. PCT/CN2018/098010 on Aug. 1, 2018, now Pat. No. 11,362,726.

(30) Foreign Application Priority Data

Aug. 9, 2017   (CN) .......................... 201710676644.6

(51) Int. Cl.
*H04B 7/08* (2006.01)
*H04W 72/0446* (2023.01)
(Continued)

(52) U.S. Cl.
CPC .......... *H04B 7/088* (2013.01); *H04W 72/046* (2013.01); *H04W 72/0446* (2013.01);
(Continued)

(58) Field of Classification Search
CPC ........ H04B 7/088; H04B 7/08; H04B 7/0695; H04W 72/0446; H04W 72/046;
(Continued)

(56) References Cited

U.S. PATENT DOCUMENTS

| 11,362,726 B2 | 6/2022 | Sun et al. | |
| 2008/0152023 A1* | 6/2008 | Yoshida | G09G 5/006 348/553 |

(Continued)

FOREIGN PATENT DOCUMENTS

| CN | 103748801 A | 4/2014 |
| CN | 104734763 A | 6/2015 |

(Continued)

OTHER PUBLICATIONS

1st Chinese Office Action for Chinese Application No. 201710676644. 6, dated Aug. 24, 2020 (dated Aug. 24, 2020)—13 pages (English translation—13 pages).

(Continued)

*Primary Examiner* — Mewale A Ambaye
(74) *Attorney, Agent, or Firm* — Culhane Meadows PLLC; Stephen J. Weed

(57) ABSTRACT

The present disclosure provides a beam indication processing method, a user equipment and a network device. The beam indication processing method includes: determining beam indication information to be used currently; determining a beam for reception according to the determined beam indication information; and performing receiving according to the determined beam.

20 Claims, 6 Drawing Sheets transmitting beam indication information to a user equipment in advance, and/or, transmitting beam indication information for indicating the current slot to the user equipment by DCI of PDCCH in the current slot, and/or, transmitting beam indication information for indicating non-slot scheduling sub-slot to the user equipment by DCI of PDCCH in the non-slot scheduling sub-slot    501

(51) Int. Cl.
*H04W 72/044* (2023.01)
*H04W 72/1263* (2023.01)
*H04W 80/02* (2009.01)
*H04W 72/23* (2023.01)

(52) U.S. Cl.
CPC ....... *H04W 72/1263* (2013.01); *H04W 72/23* (2023.01); *H04W 80/02* (2013.01)

(58) Field of Classification Search
CPC ......... H04W 72/1263; H04W 72/1289; H04W 80/02; H04W 16/28; H04W 72/14; H04W 72/04
See application file for complete search history.

(56) References Cited

U.S. PATENT DOCUMENTS

| | | |
|---|---|---|
| 2013/0028186 A1 | 1/2013 | Kim |
| 2014/0010178 A1 | 1/2014 | Yu et al. |
| 2015/0103784 A1 | 4/2015 | Hernando |
| 2016/0241322 A1 | 8/2016 | Son et al. |
| 2016/0359536 A1 | 12/2016 | Guo et al. |
| 2017/0359826 A1 | 12/2017 | Islam et al. |
| 2019/0253986 A1* | 8/2019 | Jeon ............... H04L 5/0048 |
| 2019/0254120 A1* | 8/2019 | Zhang ............. H04W 88/10 |
| 2021/0044403 A1* | 2/2021 | Zhang ............. H04L 5/0053 |
| 2021/0112583 A1* | 4/2021 | Gao ................ H04L 5/0082 |

FOREIGN PATENT DOCUMENTS

| | | | |
|---|---|---|---|
| CN | 105684321 A | 6/2016 | |
| CN | 106374984 A | 2/2017 | |
| CN | 107800467 A | 3/2018 | |
| WO | 2017023231 A1 | 2/2017 | |
| WO | WO-2017023231 A1 * | 2/2017 | ............. H04B 7/024 |

OTHER PUBLICATIONS

CATT: "Further considerations on downlink beam management," R1-1710056, 3GPP TSG RAN WG1 NR Ad-Hoc#2, Qingdao, P.R. China, Jun. 27, 2017, 5 pages.

Chinese Search Report for Chinese Application No. 201710676644. 6, dated Apr. 15, 2019 (dated Apr. 15, 2019)—7 pages (English translation—5 pages).

Ericsson: "Analysis of beam indication signalling options," R1-1711023, 3GPP TSG-RAN WG1 #89ah-NR, Qingdao, China, Jun. 27, 2017, 9 pages.

Extended European Search Report for European Application No. 18843405.4, dated Oct. 21, 2020 (dated Oct. 21, 2020)—20 pages.

Huawei, HiSilicon: "beam indication for DL control channel," R1-1709927, 3GPP TSG RAN WG1 NR Ad Hoc Meeting, Qingdao, China, Jun. 27, 2017, 4 pages.

Huawei, HiSilicon: "Mini-slot usage for eMBB in licensed band," R1-1705068, 3GPP TSG RAN WG1 Meeting #88bis, Spokane, Washington, USA, Apr. 3, 2017, 4 pages.

International Search Report and Written Opinion for International Application No. PCT/CN2018/098010, dated Feb. 20, 2020 (dated Feb. 20, 2020)—11 pages (English translation—8 pages).

Non-Final Office Action for U.S. Appl. No. 16/637,700 dated Oct. 25, 2021, 41 pages.

Partial Supplemental European Search Report for European Application No. 18843405.4, dated Jul. 27, 2020 (dated Jul. 27, 2020)—15 pages.

Samsung: "Discussion on beam indication for PDSCH," R1-1710659, 3GPP TSG RAN WG1 NR Ad-Hoc#2, Qingdao, China, Jun. 27, 2017, 4 pages.

Samsung: "Discussion on beam indication for PDSCH," R1-1714513, 3GPP TSG RAN WG1 Meeting #90, Prague, Czech, Jun. 21, 2017, 4 pages.

* cited by examiner transmitting beam indication information to a user equipment in advance, and/or, transmitting beam indication information for indicating the current slot to the user equipment by DCI of PDCCH in the current slot, and/or, transmitting beam indication information for indicating non-slot scheduling sub-slot to the user equipment by DCI of PDCCH in the non-slot scheduling sub-slot  501

FIG. 5

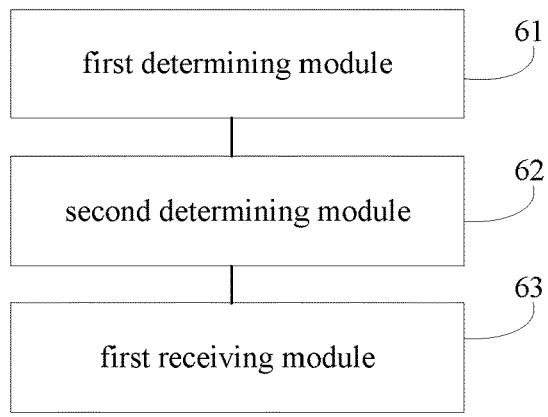

FIG. 6

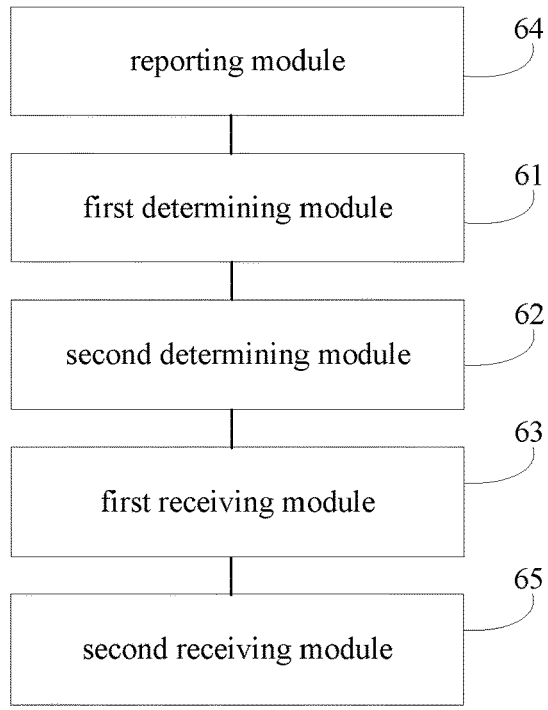

FIG. 7

METHOD AND DEVICE FOR SELECTING THE BEAM INDICATION INFORMATION FROM A NETWORK NODE WHEN RECEIVING

CROSS-REFERENCE TO RELATED APPLICATION

This application a continuation of U.S. patent application Ser. No. 16/637,700 filed on Feb. 7, 2020, which is the U.S. national phase of PCT International Application No. PCT/CN2018/098010 filed on Aug. 1, 2018, which claims the benefit and priority of Chinese Application No. 201710676644.6, filed on Aug. 9, 2017, which is incorporated herein by reference in its entirety.

TECHNICAL FIELD

The present disclosure relates to the field of communication technologies, and in particular to a beam indication processing method, a user equipment and a network device.

BACKGROUND

Currently, radio access technologies, such as Long Term Evolution (LTE)/LTE-Advanced (LTE-A), are built on the basis of the Multiple-Input Multiple-Output (MIMO) technology plus the Orthogonal Frequency Division Multiplexing (OFDM) technology. The MIMO technology can improve peak rate and system spectrum utilization via spatial freedom that a multi-antenna system can achieve.

During the development of standardization, the dimension of the MIMO technology is continuously expanding. Specifically, the LTE Rel-8 supports up to 4 layers of MIMO transmission. The Rel-9 focuses on the enhancement of Multi-User MIMO (MU-MIMO) technology. Transmission Mode (TM)-8 MU-MIMO transmission can support up to 4 Downlink (DL) data layers. The Rel-10 extends the transmission capability of Single-User MIMO (SU-MIMO) to up to 8 data layers.

The industry is further advancing the MIMO technology in the direction of three-dimensional and large-scale. Currently, the 3rd Generation Partnership Project (3GPP) has completed the research project of 3D channel modeling, and is working on research and standardization of full-dimensional eFD-MIMO and New Radio (NR) MIMO. It is foreseeable that in the future 5G mobile communication system, MIMO technology with larger scale and more antenna ports will be introduced.

Large-scale massive MIMO technology uses a large-scale antenna array, which can greatly improve utilization efficiency of system frequency band and support a larger number of access users. Therefore, the massive MIMO technology is currently regarded as one of the most promising physical layer technologies in the next-generation mobile communication systems. In the massive MIMO technology, when employing an all-digital array, the maximum spatial resolution and optimal MU-MIMO performance can be achieved. However, such structure requires a large number of digital-to-analog/analog-to-digital (AD/DA) converters as well as a large number of complete RF-baseband processing channels, both of equipment cost and baseband processing complexity will be a huge burden. In order to avoid the above implementation cost and equipment complexity, digital-analog hybrid beamforming technology emerges, that is, based on the traditional digital domain beamforming, a first-order beamforming is added to a RF signal at the position closed to the front end of the antenna system. Analog beamforming enables a relatively coarse match between the transmitted signal and the channel in a relatively simple way. The dimension of an equivalent channel formed after the analog beamforming is smaller than the actual number of antennas, and thus the required AD/DA converters, the number of digital channels and the corresponding baseband processing complexity can be greatly reduced. Residual interference of the analog beamforming may be processed again in the digital domain, thereby ensuring the quality of MU-MIMO transmission. Compared to all-digital beamforming, the digital-analog hybrid beamforming is a compromise between performance and complexity, and has a high practical prospect in high-frequency large-bandwidth or large-antenna systems.

In the research of next-generation communication systems after 4G, the operating frequency band supported by the system has been increased to more than 6 GHz, up to about 100 GHz. The high frequency band has relatively abundant idle frequency resources, which can provide greater throughput for data transmission. At present, 3GPP has completed the modeling of high-frequency channels. Compared with low-frequency bands, the wavelength of high-frequency signals is short, more antenna elements can be arranged on panels of the same size, and beams with better directivity and narrower lobe can be formed by the beamforming technology. Thus, combination of large-scale antennas and high-frequency communication is also one of the future trends.

The beamformed analog beams are transmitted in full bandwidth, and array elements of each polarization direction of each high-frequency antenna array panel can only transmit analog beams in a time division multiplexing manner. Beamforming weight of the analog beams is achieved by adjusting parameters of a RF front-end phase shifter and other devices. At present, in the academic and industrial, the training of the analog beam beamforming vector is usually performed by means of roll polling, that is, array elements of each polarization direction of each antenna panel of a terminal sequentially transmit training signals (i.e., candidate beamforming vectors) in the time-division multiplexing manner at appointed time, so that the network side uses the training signals for indication in the next beam training and transmission service.

The network side configures beam reporting setting information for the user equipment (UE) through high layer signaling, including content information of the beam reporting, time-domain related messages of the beam reporting (such as periodic, aperiodic, semi-persistent), frequency granularity of the beam reporting. The content information of the beam reporting may include identification information of at least one optimal transmit beam selected by UE, physical layer measurement results (such as L1-RSRP) of beams selected by UE, group information of beams selected by UE, and the like. Based on the beam measurement and the beam reporting of the UE, the network side can select a corresponding beam for signal transmission, and simultaneously indicate the corresponding beam information to the UE. The UE relies on beam indication information of the network side for signal reception.

Currently, the beam indication information of the network side is dynamically adjusted and has been agreed to be transmitted in physical layer control channel. In the high frequency band, the beam indication information may dynamically adjust the analog beams. Since the beam indication information is in the physical layer control channel, the UE needs to decode the control channel and then selects the corresponding analog beam according to the corresponding beam indication information for data and/or signal reception, thereby causing waste of resources. Further, when the interval between the physical control channel and scheduling data is small, this places high requirements on the UE's ability to process the physical layer control channel. This requires that the UE reasonably selects the beam indication information from the network side when receiving. However, there is no conclusion in the prior art on how to reasonably select the beam indication information from the network side.

SUMMARY

In a first aspect, one embodiment of the present disclosure provides a beam indication processing method applied to a user equipment, including: determining beam indication information to be currently used; determining a beam for reception according to the determined beam indication information; and, performing receiving according to the determined beam.

In a second aspect, one embodiment of the present disclosure provides a beam indication processing method applied to a network device, including: transmitting beam indication information to a user equipment in advance, and/or, transmitting beam indication information for indicating a current slot to a user equipment by DCI of PDCCH in the current slot, and/or, transmitting beam indication information for indicating a non-slot scheduling sub-slot to a user equipment by DCI of PDCCH in the non-slot scheduling sub-slot.

In a third aspect, one embodiment of the present disclosure provides a user equipment including: a first determining module configured to determine beam indication information to be currently used; a second determining module configured to determine a beam for reception according to the determined beam indication information; and a first receiving module configured to perform receiving according to the determined beam.

In a fourth aspect, one embodiment of the present disclosure provides a network device, including: a first transmission module configured to transmit beam indication information to a user equipment in advance, and/or, transmit beam indication information for indicating a current slot to a user equipment by DCI of PDCCH in the current slot, and/or, transmit beam indication information for indicating a non-slot scheduling sub-slot to a user equipment by DCI of PDCCH in the non-slot scheduling sub-slot.

In a fifth aspect, one embodiment of the present disclosure provides a user equipment including: a memory, a processor, and a beam indication processing program stored on the memory and executable on the processor; wherein the beam indication processing program is executed by the processor to implement steps of the above beam indication processing method applied to the user equipment.

In a sixth aspect, one embodiment of the present disclosure provides a network device including: a memory, a processor, and a beam indication processing program stored on the memory and executable on the processor; wherein the beam indication processing program is executed by the processor to implement steps of the above beam indication processing method applied to the network device.

In a seventh aspect, one embodiment of the present disclosure provides a computer readable storage medium including a beam indication processing program stored thereon; wherein the beam indication processing program is executed by a processor to implement steps of the above beam indication processing method applied to the user equipment.

In an eighth aspect, one embodiment of the present disclosure provides a computer readable storage medium including a beam indication processing program stored thereon; wherein the beam indication processing program is executed by a processor to implement steps of the above beam indication processing method applied to the network device.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

FIG. 5 is a flow chart of a beam indication processing method according to another embodiment of the present disclosure;

FIG. 6 is a first schematic diagram of a user equipment according to an embodiment of the present disclosure;

FIG. 7 is a second schematic diagram of a user equipment according to an embodiment of the present disclosure;

DETAILED DESCRIPTION

In order to more clearly illustrate the technical solutions of the embodiments of the present disclosure, the drawings to be used in the embodiments of the present disclosure will be briefly described below. It is obvious that the drawings in the following description are only some embodiments of the present disclosure, Those skilled in the art can also obtain other drawings based on these drawings without paying for creative labor.

Figure 1:
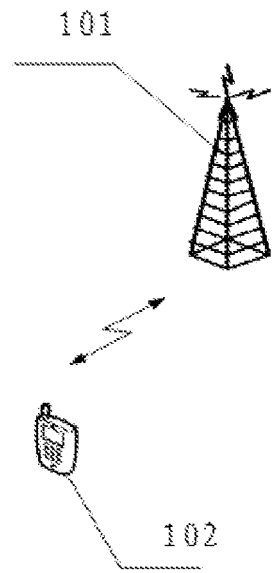
FIG. 1 is a schematic diagram showing a system architecture of a beam indication processing method according to an embodiment of the present disclosure.

FIG. 1 is a schematic diagram showing a system architecture of a beam indication processing method according to an embodiment of the present disclosure. As shown in FIG. 1, the system architecture provided in the embodiment of the present disclosure includes a network device 101 and a user equipment 102.

The network device 101 may be a Base Transceiver Station (BTS) in Global System of Mobile communication (GSM) or Code Division Multiple Access (CDMA), a NodeB (NB) in Wideband Code Division Multiple Access (WCDMA), an Evolutional Node B (eNB or eNodeB) in LTE, a base station in New radio access technical (New RAT or NR), a relay station or an access point, or a base station in the future 5G network, etc., which is not limited herein.

The user equipment 102 may be a wireless terminal, which may be a device that provides only voice and/or other service data connectivity to users, a handheld device with wireless connectivity, or other processing device that is coupled to a wireless modem. The user equipment 102 may communicate with one or at least one core network via Radio Access Network (RAN). The user equipment 102 may be a portable, pocket-sized, handheld, computer built-in or in-vehicle mobile device that exchanges language and/or data with a wireless access network, such as Personal Communication Service (PCS) phone, cordless phone, Session Initiation Protocol (SIP) phone, Wireless Local Loop (WLL) station, Personal Digital Assistant (PDA). The user equipment 102 may also be referred to as a system, a Subscriber Unit, a Subscriber Station, a mobile station, a mobile, a remote station, a remote terminal, an access terminal, a user terminal, a user agent, a user device or a user equipment, which is not limited herein.

Figure 2:
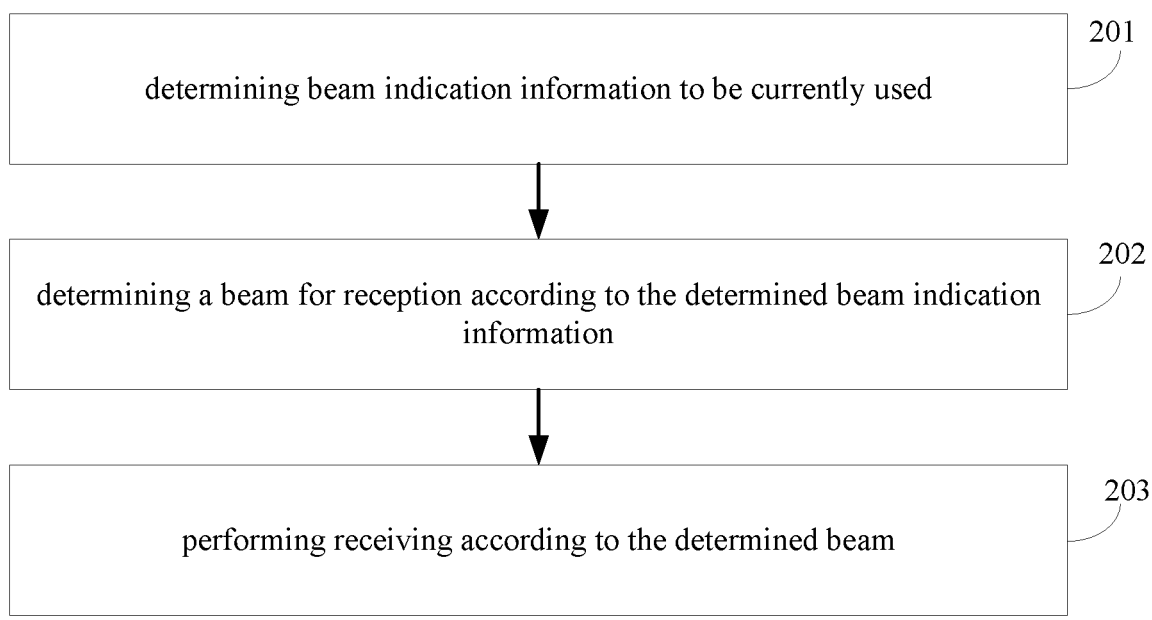
FIG. 2 is a flow chart of a beam indication processing method according to an embodiment of the present disclosure.

Referring to FIG. 2, one embodiment of the present disclosure provides a beam indication processing method, which is applied to a user equipment and includes the following steps.

Step 201: determining beam indication information to be currently used.

When determining beam indication information to be currently used, the user equipment may determine the beam indication information to be currently used according to a preset rule, such as a pre-arrangement of the user equipment and the network side and a protocol agreement, or according to actual situation of the terminal. The beam indication information to be currently used, which is determined by the user equipment, may be information indicated by the network device, implicitly, explicitly or in advance.

Step 202: determining a beam for reception according to the determined beam indication information.

When the user equipment determines the beam for reception according to the determined beam indication information, the user equipment may determine the beam for reception according to a preset rule and/or an indication of the network side.

Step 203: performing receiving according to the determined beam.

After determining the beam for reception, the user equipment may perform receiving of corresponding data and/or signal according to the determined beam based on current actual situation.

By determining beam indication information to be currently used, determining a beam for reception according to the determined beam indication information and performing receiving according to the determined beam, the beam indication processing method of the embodiment of the present disclosure can enable the user equipment to reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

In the embodiment of the present disclosure, when determining the beam indication information to be used currently, the user equipment may select beam indication information that is transmitted in advance by the network side. Specifically, the step 201 may include:

obtaining, by the user equipment, the beam indication information that is transmitted in advance by the network device through Media Access Control (MAC) control element or Downlink control information (DCI).

For example, when the beam indication information in MAC control element or DCI is transmitted in an N-th slot, the beam indication information may be valid in a (N+X)-th (X is a positive integer greater than or equal to 0) slot. In other words, from the (N+X)-th slot, both of the network device and the user equipment consider that the corresponding beam information is the beam information indicated in the N-th slot.

In this way, by indicating the beam indication information in advance through the MAC control element or the DCI, it can reduce the waste of resources caused by that the user equipment decodes the beam indication information in real time, thereby reducing requirements for the processing capability of the terminal and timing.

A valid period of the beam indication information transmitted by the network device in advance may be specifically:

from a moment when the beam indication information is transmitted until the network device notifies other beam indication information or the network device closes the beam indication information; or, K slots specified by the preset rule; or, K slots specified by the preset rule, unless the network device notifies other beam indication information or the network device closes the beam indication information; or, K slots specified by the preset rule, unless other event specified by the preset rule occurs;

where K is a positive integer greater than or equal to 1, and other beam indication information is other indication information which is transmitted by the network device and different from the beam indication information.

Specifically, the beam indication information in the DCI may be transmitted together with other data scheduling information, or may be separately transmitted on a Physical Downlink Control Channel (PDCCH).

In the embodiment of the present disclosure, the beam indicated by the beam indication information transmitted by the network device in advance may be one beam or at least two beams. Accordingly, the step 202 may include:

when the beam indicated by the beam indication information is one beam, determining, by the user equipment, the one beam as a beam for reception; or, when the beam indicated by the beam indication information is at least two beams, determining, by the user equipment, a beam specified by the preset rule in the at least two beams, as a beam for reception; or, determining a subsequently indicated beam of the at least two beams as a beam for reception; or, determining a beam specified by the preset rule in the at least two beams, as a beam for reception, until a subsequent indication is received.

The preset rule is, for example, a pre-arrangement, a protocol agreement of the user equipment and the network side, and the like. The subsequently indicated beam may be a specified beam of at least one beam selected by the network device in advance from the at least two beams.

In the embodiment of the present disclosure, before determining the beam indication information, the user equipment may report terminal capability information and/or beam measurement report to the network device, so that the network device performs corresponding scheduling and beam indication. Specifically, before the step 201, the processing method may further include:

reporting, by the user equipment, the terminal capability information and/or the beam measurement report to the network device.

The terminal capability information may include at least one of the following information: terminal processing capability information and spatial related information. The terminal processing capability information mainly includes time required for the user equipment to decode the control channel, and the like. The spatial related information may include structural information of antenna and the like. The beam measurement report may include at least one of the following information: which transmission beams correspond to same terminal receive beams, and which transmission beams correspond to different terminal receive beams.

In the embodiment of the present disclosure, the network device may use DCI carried in the PDCCH to indicate beam indication information of physical downlink shared channel (PDSCH) in the same slot as the PDCCH. Specifically, when the user equipment receives data and/or reference signal of PDSCH in the current slot, the step 201 may include:

before decoding DCI of PDCCH in the current slot is completed, determining, the beam indication information that is transmitted in advance by the network device, as the beam indication information to be used currently; or, before decoding DCI of PDCCH in the current slot is completed, determining, beam indication information used by the user equipment in last scheduling of another PDSCH, as the beam indication information to be used currently; where the another PDSCH is PDSCH in a previous slot as compared with the current slot, for example, if the current slot is tenth slot, the another PDSCH may be in the ninth slot, the seventh slot or the fifth slot; or, before decoding DCI of PDCCH in the current slot is completed, determining, beam indication information used by the user equipment in last successful reception of another PDSCH, as the beam indication information to be used currently; or, before decoding DCI of PDCCH in the current slot is completed, determining, beam indication information used by the user equipment for receiving the PDCCH, as the beam indication information to be used currently; or, after decoding DCI of PDCCH in the current slot is completed, when the DCI includes beam indication information for indicating the current slot, determining the beam indication information as the beam indication information to be used currently; or, after decoding DCI of PDCCH in the current slot is completed, when the DCI does not include beam indication information for indicating the current slot, determining, the beam indication information that is transmitted in advance by the network device, as the beam indication information to be used currently; or, after decoding DCI of PDCCH in the current slot is completed, when the DCI does not include beam indication information for indicating the current slot, determining, beam indication information used by the user equipment in last scheduling of another PDSCH, as the beam indication information to be used currently; or, after decoding DCI of PDCCH in the current slot is completed, when the DCI does not include beam indication information for indicating the current slot, determining, beam indication information used by the user equipment for receiving the PDCCH, as the beam indication information to be used currently; or, after decoding DCI of PDCCH in the current slot is completed, when the DCI does not include beam indication information for indicating the current slot, determining, beam indication information used by the user equipment for corresponding symbols before decoding the DCI is completed, as the beam indication information to be used currently.

In this way, by dynamically indicating the beam of the current slot through the DCI, data transmission delay can be reduced. Further, before decoding the DCI is completed, the beam indication information is determined according to the preset rule, so that the corresponding beam can still be used for normal reception when the beam has not changed, thereby effectively reducing waste of resources.

It should be noted that the foregoing manners of determining the beam indication information to be currently used may be further applicable to a situation in which an interval between reception of the PDSCH in the current slot and the corresponding physical layer's correct decoding acknowledgement/negative signal is less than a preset number of symbols. The preset number of symbols is usually preset.

Specifically, according to whether to correct the beam indication information in the current slot, the network device may configure a time interval between the PDCCH in the current slot and PDSCH scheduled by the PDCCH.

When DCI of the PDCCH does not include beam indication information for indicating the current slot, there is no time interval between the PDCCH and the PDSCH scheduled by the PDCCH; or, when DCI of the PDCCH includes beam indication information for indicating the current slot, there is a time interval between the PDCCH and the PDSCH scheduled by the PDCCH; or, when DCI of the PDCCH includes beam indication information for indicating the current slot and different transmission beams of the network device correspond to different terminal reception beams, there is a time interval between the PDCCH and the PDSCH scheduled by the PDCCH; or, when DCI of the PDCCH includes beam indication information for indicating the current slot and different transmission beams of the network device correspond to the same terminal reception beam, there is no time interval between the PDCCH and the PDSCH scheduled by the PDCCH.

A length of the time interval between the PDCCH and the PDSCH scheduled by the PDCCH may be determined by the network device according to PDCCH decoding time reported by the user equipment.

Specifically, when the DCI of the PDCCH includes the beam indication information for indicating the current slot, the beam indication information may be valid only in the current slot, may continue to be valid after the current slot, or may continue to be valid after the current slot in case that the network device successfully receives the correct decoding acknowledgement signal from the physical layer.

In one embodiment of the present disclosure, before the step 203, the processing method may further include:

receiving, by the user equipment, high layer signaling configuration information transmitted by the network device, where the high layer signaling configuration information is used to implicitly indicate position of De-modulation Reference Signal (DMRS) of the PDSCH in the current slot.

Accordingly, the step 203 may include:

receiving, by the user equipment, data and/or reference signal of the PDSCH according to the determined beam and the position of the DMRS of the PDSCH in the current slot.

When the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

In the embodiment of the present disclosure, for non-slot scheduling (i.e., scheduling of control channel and scheduling data may start from any symbol position in the slot) in the current slot, the network device may use DCI in PDCCH carried in a non-slot scheduling sub-slot to indicate beam indication information of PDSCH in the non-slot scheduling sub-slot. Specifically, when the user equipment receives data and/or reference signal of PDSCH in a non-slot scheduling sub-slot in the current slot, the step 201 may include:

before decoding DCI of PDCCH in the non-slot scheduling sub-slot is completed, determining, the beam indication information corresponding to the current slot, as the beam indication information to be used currently, where the beam indication information corresponding to the current slot may be the beam indication information that is transmitted in advance by the network device or the beam indication information included in DCI of PDCCH in the current slot; or, before decoding DCI of PDCCH in the non-slot scheduling sub-slot is completed, determining, the beam indication information used by the user equipment in last non-slot scheduling, as the beam indication information to be used currently; where the last non-slot scheduling may be in the current slot or a previous slot as compared with the current slot; or, before decoding DCI of PDCCH in the non-slot scheduling sub-slot is completed, determining, beam indication information used by the user equipment when the user equipment successfully schedules other PDSCH in the last non-slot scheduling, as the beam indication information to be used currently; or, before decoding DCI of PDCCH in the non-slot scheduling sub-slot is completed, determining, beam indication information used by the user equipment for receiving the PDCCH, as the beam indication information to be used currently; or, after decoding DCI of PDCCH in the non-slot scheduling sub-slot is completed, when the DCI includes beam indication information for indicating the non-slot scheduling sub-slot, determining the beam indication information as the beam indication information to be used currently; or, after decoding DCI of PDCCH in the non-slot scheduling sub-slot is completed, when the DCI does not include beam indication information for indicating the non-slot scheduling sub-slot, determining, the beam indication information corresponding to the current slot, as the beam indication information to be used currently; or, after decoding DCI of PDCCH in the non-slot scheduling sub-slot is completed, when the DCI does not include beam indication information for indicating the non-slot scheduling sub-slot, determining, the beam indication information used by the user equipment in last non-slot scheduling, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for receiving the PDCCH, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for corresponding symbols before decoding the DCI is completed, as the beam indication information to be used currently.

In this way, by dynamically indicating the beam of the non-slot scheduling sub-slot through the DCI, the beam can be adjusted in real time. Further, before decoding the DCI is completed, the beam indication information is determined according to the preset rule, so that the corresponding beam can still be used for normal reception when the beam has not changed, thereby effectively reducing waste of resources.

Specifically, according to whether to correct the beam indication information in the non-slot scheduling sub-slot, the network device may configure a time interval between the PDCCH in the non-slot scheduling sub-slot and PDSCH scheduled by the PDCCH.

When DCI of the PDCCH does not include beam indication information for indicating the non-slot scheduling sub-slot, there is no time interval between the PDCCH and the PDSCH scheduled by the PDCCH; or, when DCI of the PDCCH includes beam indication information for indicating the non-slot scheduling sub-slot, there is a time interval between the PDCCH and the PDSCH scheduled by the PDCCH; or, when DCI of the PDCCH includes beam indication information for indicating the non-slot scheduling sub-slot and different transmission beams of the network device correspond to different terminal reception beams, there is a time interval between the PDCCH and the PDSCH scheduled by the PDCCH; or, when DCI of the PDCCH includes beam indication information for indicating the non-slot scheduling sub-slot and different transmission beams of the network device correspond to the same terminal reception beam, there is no time interval between the PDCCH and the PDSCH scheduled by the PDCCH.

A length of the time interval between the PDCCH and the PDSCH scheduled by the PDCCH may be determined by the network device according to PDCCH decoding time reported by the user equipment.

Specifically, when the DCI of the PDCCH includes the beam indication information for indicating the non-slot scheduling sub-slot, the beam indication information may be valid only in the non-slot scheduling sub-slot, may continue to be valid after the non-slot scheduling sub-slot, or may continue to be valid after the non-slot scheduling sub-slot in case that the network device successfully receives the correct decoding acknowledgement signal from the physical layer.

Hereinafter, processes of determining beam indication information according to a first example and a second example of the present disclosure will be described with reference to FIG. 3 and FIG. 4, respectively.

First Example

Figure 3:
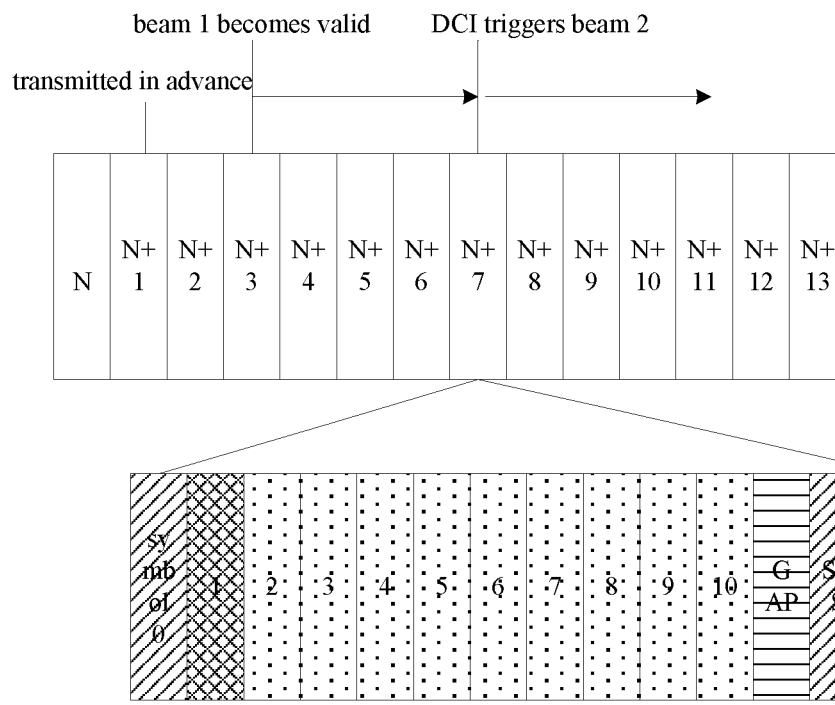
FIG. 3 is a schematic diagram of an application scenario of a first example of the present disclosure.

Referring to FIG. 3, in the first example, there are 14 slots, which are slot N, slot (N+1), slot (N+2), slot (N+3), . . . , slot (N+12) and slot (N+13), respectively. For these slots, a beam validation process may include:

(1) in the slot (N+1), the network side transmits in advance beam indication information to UE1 through the MAC control element to activate multiple beams;

(2) starting from slot (N+3), according to the preset rule, beam 1 of the activated beams becomes valid, and UE1 receives data based on the beam 1 in the slot (N+3), slot (N+4), slot (N+5) and slot (N+6);

(3) in the slot (N+7), DCI of PDCCH in symbol 0 includes new beam indication information which can trigger beam 2, and the beam 2 may become valid after the network side receives correct decoding acknowledgement signal from the physical layer; at symbol 1, since the UE1 cannot fully decode the PDCCH in symbol 0 before reception, the UE1 still receives data according to beam indication information that is valid in the slot (N+6), i.e., the beam 1; at symbols 2-10, the UE1 can decode the PDCCH before reception, the UE1 receives data according to new beam indication information, i.e., the beam 2; after the data is correctly received, the UE1 feeds back correct reception ACK information on symbol 13; since the network side learns in advance that the UE1 cannot correctly decode the PDCCH before reception at the symbol 1, the network side schedules not transmitting data at the symbol 1, and may use scheduling information to notify the UE1 of indication information indicating that the network side does not transmit data at the symbol 1; after the UE1 learns the indication information, the UE1 discards data received at the symbol 1;

(4) after the network side receives the ACK information, the new beam indication information, i.e., the beam 2, becomes valid from the slot (N+8).

In this way, by indicating the beam indication information in advance through the MAC control element, it can reduce the waste of resources and reduce requirements for the processing capability of the terminal and timing. Meanwhile, the MAC control element activates multiple beams, and DCI is dynamically selected therefrom, thereby reducing overhead of dynamic notification. Meanwhile, before decoding the DCI is completed, the UE determines the beam indication information according to the preset rule, and can still use the corresponding beam for normal reception when the beam has not changed, thereby effectively reducing waste of resources.

Second Example

Figure 4:
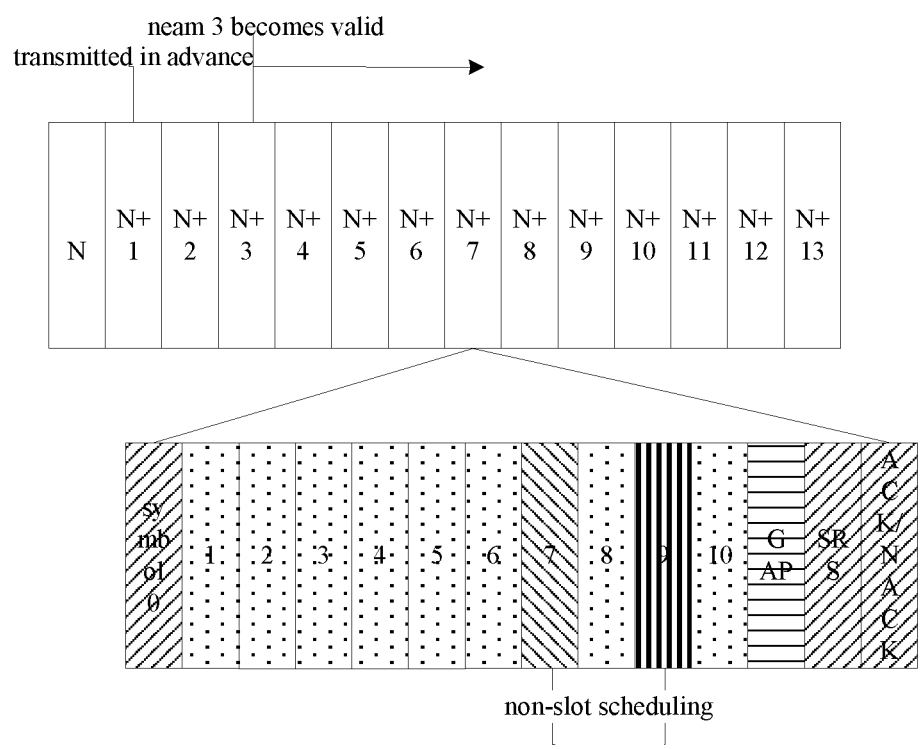
FIG. 4 is a schematic diagram of an application scenario of a second example of the present disclosure.

Referring to FIG. 4, in the second example, there are 14 slots, which are slot N, slot (N+1), slot (N+2), slot (N+3), . . . , slot (N+12) and slot (N+13), respectively. For these slots, a beam validation process may include:

(1) in the slot (N+1), the network side transmits in advance beam indication information to UE2 through the MAC control element to activate multiple beams;

(2) starting from slot (N+3), according to the preset rule, beam 3 of the activated beams becomes valid, and UE2 receives data based on the beam 3 in the slot (N+3), slot (N+4), slot (N+5) and slot (N+6);

(3) in the slot (N+7), non-slot scheduling occurs at the same time as normal scheduling, that is, from symbol 7 and symbol 9, the symbol 7 is a control symbol of the non-slot scheduling, and DCI of PDCCH in the symbol 7 includes new beam indication information for indicating non-slot scheduling sub-slot, and the new beam indication information can trigger beam 4; at symbol 8, since the UE2 cannot fully decode the PDCCH in symbol 7 before reception, the UE2 still receives data according to beam indication information that is valid in the slot (N+6), i.e., the beam 3; at symbol 9, the UE2 can decode the PDCCH before reception, the UE2 receives data according to new beam indication information, i.e., the beam 4; at symbol 10, the UE2 still receives data according to the beam which normally receives data in slot (N+7), i.e., the beam 3;

(4) after the network side receives the ACK information, the new beam indication information, i.e., the beam 4, becomes valid from the slot (N+8).

In this way, by dynamically indicating the beam of the non-slot scheduling sub-slot through the DCI, the beam can be adjusted in real time. Meanwhile, before decoding the DCI is completed, the UE determines the beam indication information according to the preset rule, so that the UE can still USE the corresponding beam for normal reception when the beam has not changed, thereby effectively reducing waste of resources.

As shown in FIG. 5, one embodiment of the present disclosure further provides a beam indication processing method, which is applied to a network device, and includes the following steps.

Step 501: transmitting beam indication information to a user equipment in advance, and/or, transmitting beam indication information for indicating the current slot to the user equipment by DCI of PDCCH in the current slot, and/or, transmitting beam indication information for indicating non-slot scheduling sub-slot to the user equipment by DCI of PDCCH in the non-slot scheduling sub-slot.

By transmitting multiple types of beam indication information to the user equipment, the beam indication processing method of the embodiment of the present disclosure can facilitate the user equipment to reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

In one embodiment of the present disclosure, the transmitting beam indication information to a user equipment in advance, includes:

transmitting, by the network device, the beam indication information to the user equipment in advance through MAC control element or DCI.

Specifically, before the step 501, the processing method may further include:

receiving, by the network device, terminal capability information and/or beam measurement report reported by the user equipment.

In one embodiment of the present disclosure, the processing method may further include:

transmitting, by the network device, high layer signaling configuration information to the user equipment; where the high layer signaling configuration information is used to implicitly indicate position of De-modulation Reference Signal (DMRS) of PDSCH in the current slot.

Further, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

The above embodiment describes the beam indication processing method of the present disclosure. The user equipment and the network device corresponding to the beam indication processing method of the present disclosure will be described hereinafter with reference to the embodiments and the accompanying drawings.

Referring to FIG. 6, one embodiment of the present disclosure further provides a user equipment. The user equipment includes a first determining module 61, a second determining module 62 and a first receiving module 63.

The first determining module 61 is used to determine beam indication information to be currently used.

The second determining module 62 is used to determine a beam for reception according to the determined beam indication information.

The first receiving module 63 is used to perform receiving according to the determined beam.

By determining beam indication information to be currently used, determining a beam for reception according to the determined beam indication information and performing receiving according to the determined beam, the user equipment of the embodiment of the present disclosure can reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

In the embodiment of the present disclosure, the first determining module 61 is specifically used to:

obtain the beam indication information that is transmitted in advance by the network device through Media Access Control (MAC) control element or Downlink control information (DCI).

Optionally, a valid period of the beam indication information may be specifically:

from a moment when the beam indication information is transmitted until the network device notifies other beam indication information or the network device closes the beam indication information; or, K slots specified by the preset rule; or, K slots specified by the preset rule, unless the network device notifies other beam indication information or the network device closes the beam indication information; or, K slots specified by the preset rule, unless other event specified by the preset rule occurs;

where K is a positive integer greater than or equal to 1.

Optionally, the beam indication information in the DCI may be transmitted together with other data scheduling information, or may be separately transmitted on a Physical Downlink Control Channel (PDCCH).

In the embodiment of the present disclosure, the beam indicated by the beam indication information may be one beam or at least two beams, and the second determining module 62 is specifically used to:

when the beam indicated by the beam indication information is one beam, determine the one beam as a beam for reception; or, when the beam indicated by the beam indication information is at least two beams, determine a beam specified by the preset rule in the at least two beams, as a beam for reception; or, determine a subsequently indicated beam of the at least two beams as a beam for reception; or, determine a beam specified by the preset rule in the at least two beams, as a beam for reception, until a subsequent indication is received.

Further, the subsequently indicated beam may be a specified beam of at least one beam selected in advance from the at least two beams.

In the embodiment of the present disclosure, as shown in FIG. 7, the user equipment further includes a reporting module 64.

The reporting module 64 is used to report terminal capability information and/or beam measurement report to the network device.

Optionally, the terminal capability information includes at least one of the following information: terminal processing capability information and spatial related information.

The beam measurement report may include at least one of the following information: which transmission beams correspond to same terminal receive beams, and which transmission beams correspond to different terminal receive beams.

In the embodiment of the present disclosure, when the user equipment receives data and/or reference signal of PDSCH in the current slot, the first determining module 61 is specifically used to:

before decoding DCI of PDCCH in the current slot is completed, determine, the beam indication information that is transmitted in advance by the network device, as the beam indication information to be used currently; or, before decoding DCI of PDCCH in the current slot is completed, determine, beam indication information used by the user equipment in last scheduling of another PDSCH, as the beam indication information to be used currently; or, before decoding DCI of PDCCH in the current slot is completed, determine, beam indication information used by the user equipment in last successful reception of another PDSCH, as the beam indication information to be used currently; or, before decoding DCI of PDCCH in the current slot is completed, determine, beam indication information used by the user equipment for receiving the PDCCH, as the beam indication information to be used currently; or, after decoding DCI of PDCCH in the current slot is completed, when the DCI includes beam indication information for indicating the current slot, determine the beam indication information as the beam indication information to be used currently; or, after decoding DCI of PDCCH in the current slot is completed, when the DCI does not include beam indication information for indicating the current slot, determine, the beam indication information that is transmitted in advance by the network device, as the beam indication information to be used currently; or, after decoding DCI of PDCCH in the current slot is completed, when the DCI does not include beam indication information for indicating the current slot, determine, beam indication information used by the user equipment in last scheduling of another PDSCH, as the beam indication information to be used currently; or, after decoding DCI of PDCCH in the current slot is completed, when the DCI does not include beam indication information for indicating the current slot, determine, beam indication information used by the user equipment for receiving the PDCCH, as the beam indication information to be used currently; or, after decoding DCI of PDCCH in the current slot is completed, when the DCI does not include beam indication information for indicating the current slot, determine, beam indication information used by the user equipment for corresponding symbols before decoding the DCI is completed, as the beam indication information to be used currently.

Further, when the DCI does not include beam indication information for indicating the current slot, there is no time interval between the PDCCH and the PDSCH scheduled by the PDCCH; or, when the DCI includes beam indication information for indicating the current slot, there is a time interval between the PDCCH and the PDSCH scheduled by the PDCCH; or, when the DCI includes beam indication information for indicating the current slot and different transmission beams of the network device correspond to different terminal reception beams, there is a time interval between the PDCCH and the PDSCH scheduled by the PDCCH; or, when the DCI includes beam indication information for indicating the current slot and different transmission beams of the network device correspond to the same terminal reception beam, there is no time interval between the PDCCH and the PDSCH scheduled by the PDCCH.

A length of the time interval between the PDCCH and the PDSCH scheduled by the PDCCH may be determined by the network device according to PDCCH decoding time reported by the user equipment.

Further, when the DCI includes the beam indication information for indicating the current slot, the beam indication information may be valid only in the current slot, may continue to be valid after the current slot, or may continue to be valid after the current slot in case that the network device successfully receives the correct decoding acknowledgement signal from the physical layer.

Further, the interval between reception of the PDSCH and the corresponding physical layer's correct decoding acknowledgement/negative signal is smaller than a preset number of symbols.

In one embodiment of the present disclosure, as shown in FIG. 7, the user equipment further includes a second receiving module 65.

The second receiving module 65 is used to receive high layer signaling configuration information transmitted by the network device, where the high layer signaling configuration information is used to implicitly indicate position of Demodulation Reference Signal (DMRS) of the PDSCH in the current slot.

The first receiving module 63 is specifically used to:

receive data and/or reference signal of the PDSCH according to the determined beam and the position of the DMRS of the PDSCH in the current slot.

Further, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

In the embodiment of the present disclosure, when the user equipment receives data and/or reference signal of PDSCH in a non-slot scheduling sub-slot in the current slot, the first determining module 61 is specifically used to:

before decoding DCI of PDCCH in the non-slot scheduling sub-slot is completed, determine, the beam indication information corresponding to the current slot, as the beam indication information to be used currently; or, before decoding DCI of PDCCH in the non-slot scheduling sub-slot is completed, determine, the beam indication information used by the user equipment in last non-slot scheduling, as the beam indication information to be used currently; or, before decoding DCI of PDCCH in the non-slot scheduling sub-slot is completed, determine, beam indication information used by the user equipment when the user equipment successfully schedules other PDSCH in the last non-slot scheduling, as the beam indication information to be used currently; or, before decoding DCI of PDCCH in the non-slot scheduling sub-slot is completed, determine, beam indication information used by the user equipment for receiving the PDCCH, as the beam indication information to be used currently; or, after decoding DCI of PDCCH in the non-slot scheduling sub-slot is completed, when the DCI includes beam indication information for indicating the non-slot scheduling sub-slot, determine the beam indication information as the beam indication information to be used currently; or, after decoding DCI of PDCCH in the non-slot scheduling sub-slot is completed, when the DCI does not include beam indication information for indicating the non-slot scheduling sub-slot, determine, the beam indication information corresponding to the current slot, as the beam indication information to be used currently; or, after decoding DCI of PDCCH in the non-slot scheduling sub-slot is completed, when the DCI does not include beam indication information for indicating the non-slot scheduling sub-slot, determine, the beam indication information used by the user equipment in last non-slot scheduling, as the beam indication information to be used currently; or, after decoding DCI of PDCCH in the non-slot scheduling sub-slot is completed, when the DCI does not include beam indication information for indicating the non-slot scheduling sub-slot, determine, beam indication information used by the user equipment for receiving the PDCCH, as the beam indication information to be used currently; or, after decoding DCI of PDCCH in the non-slot scheduling sub-slot is completed, when the DCI does not include beam indication information for indicating the non-slot scheduling sub-slot, determine, beam indication information used by the user equipment for corresponding symbols before decoding the DCI is completed, as the beam indication information to be used currently.

Further, the beam indication information corresponding to the current slot may be the beam indication information that is transmitted in advance by the network device or the beam indication information included in DCI of PDCCH in the current slot.

Further, when DCI does not include beam indication information for indicating the non-slot scheduling sub-slot, there is no time interval between the PDCCH and the PDSCH scheduled by the PDCCH; or, when the DCI includes beam indication information for indicating the non-slot scheduling sub-slot, there is a time interval between the PDCCH and the PDSCH scheduled by the PDCCH; or, when the DCI includes beam indication information for indicating the non-slot scheduling sub-slot and different transmission beams of the network device correspond to different terminal reception beams, there is a time interval between the PDCCH and the PDSCH scheduled by the PDCCH; or, when the DCI includes beam indication information for indicating the non-slot scheduling sub-slot and different transmission beams of the network device correspond to the same terminal reception beam, there is no time interval between the PDCCH and the PDSCH scheduled by the PDCCH.

A length of the time interval between the PDCCH and the PDSCH scheduled by the PDCCH may be determined by the network device according to PDCCH decoding time reported by the user equipment.

Further, when the DCI includes the beam indication information for indicating the non-slot scheduling sub-slot, the beam indication information may be valid only in the non-slot scheduling sub-slot, may continue to be valid after the non-slot scheduling sub-slot, or may continue to be valid after the non-slot scheduling sub-slot in case that the network device successfully receives the correct decoding acknowledgement signal from the physical layer.

Figure 8:
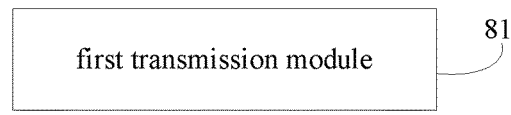
FIG. 8 is a first schematic diagram of a network device according to an embodiment of the present disclosure.

As shown in FIG. 8, one embodiment of the present disclosure further provides a network device. The network device includes a first transmission module 81.

The first transmission module 81 is used to transmit beam indication information to a user equipment in advance, and/or, transmit beam indication information for indicating the current slot to the user equipment by DCI of PDCCH in the current slot, and/or, transmit beam indication information for indicating non-slot scheduling sub-slot to the user equipment by DCI of PDCCH in the non-slot scheduling sub-slot.

By transmitting multiple types of beam indication information to the user equipment, the network device of the embodiment of the present disclosure can facilitate the user equipment to reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

Further, the first transmission module 81 is specifically used to transmit the beam indication information to the user equipment in advance through MAC control element or DCI.

In one embodiment of the disclosure, the network device further includes: a third receiving module used to receive terminal capability information and/or beam measurement report reported by the user equipment.

In one embodiment of the disclosure, the network device further includes:

a second transmission module used to transmit high layer signaling configuration information to the user equipment; where the high layer signaling configuration information is used to implicitly indicate position of De-modulation Reference Signal (DMRS) of PDSCH in the current slot.

Further, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

In addition, one embodiment of the present disclosure further provides a user equipment, including a processor, a memory, and a beam indication processing program stored on the memory and executable on the processor. The beam indication processing program is executed by the processor to implement various procedures of the beam indication processing method which is applied to the user equipment in the foregoing embodiment, and the same technical effects can be achieved. To avoid repetition, details are not described herein again.

Figure 9:
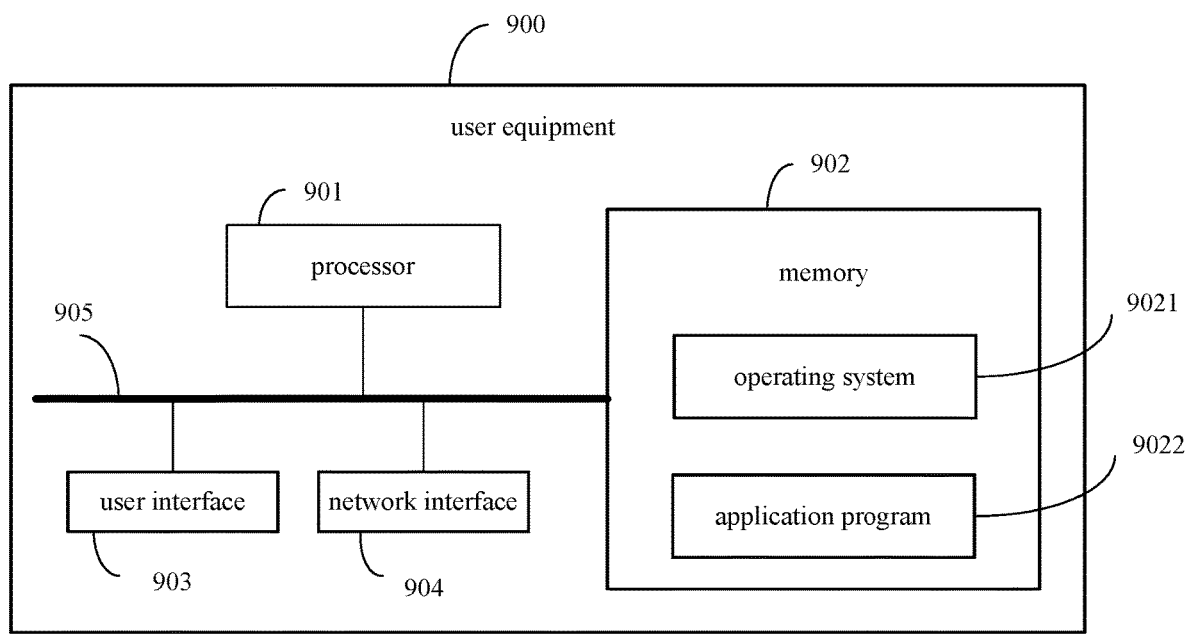
FIG. 9 is a third schematic diagram of a user equipment according to an embodiment of the present disclosure.

Specifically, FIG. 9 is a schematic diagram of a user equipment according to an embodiment of the present disclosure. The user equipment 900 shown in FIG. 9 includes at least one processor 901, a memory 902, a user interface 903, and at least one network interface 904. The various components in user equipment 900 are coupled together by a bus system 905. It will be appreciated that the bus system 905 is configured to implement the connection and communication among the components. The bus system 905 includes a power bus, control bus, state signal bus besides a data bus. For the clarity of description, each bus in the FIG. 9 is denoted as the bus system 905.

The user interface 903 may include a monitor, keyboard, or clickable device (for example, a mouse, track ball, touchpad, or touch screen).

It can be understood that the memory 902 in embodiments of the present disclosure may be a volatile storage or a nonvolatile storage, or both the volatile storage and nonvolatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DR-RAM). The memory 902 in the system and method described in embodiments of the present disclosure include, but is not limited to, these and any other suitable types of storages.

In some embodiments, the memory 902 stores following elements, such as executable modules, data structure, subset thereof, or superset thereof: operating system 9021 and an application program 9022.

The operating system 9021 includes various kinds of system programs, such as a framework layer, a core library layer and a driver layer, which are used to implement various kinds of basic services and process hardware-based tasks. The application program 9022 includes various kinds of application programs, such as Media Player and Browser, which are used to implement various kinds of application services. Programs, which are used to implement the methods in embodiments of the present disclosure, may be included in the application program 9022.

In an embodiment of the present disclosure, the user equipment 900 further includes: a beam indication processing program which is stored on the memory 902 and executable on the processor 901. Specifically, the beam indication processing program may be a beam indication processing program in the application 9022. The beam indication processing program is executed by the processor 901 to implement the following steps: determining beam indication information to be currently used; determining a beam for reception according to the determined beam indication information; and, performing receiving according to the determined beam.

The methods in the above embodiments of the present disclosure may be applied to or implemented by the processor 901. The processor 901 may be an integrated circuit chip with signal processing capability. In the implementation process, each step of the above method can be completed by the integrated logic circuit of the hardware in processor 901 or the instructions in the form of software. The Processor 901 mentioned above may be a general purpose Processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 902, and the processor 901 reads the information in the memory 902 to implement steps in the above method in combination with the hardware.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the beam indication processing program is executed by the processor 901 to further implement the following steps: obtaining the beam indication information that is transmitted in advance by the network device through Media Access Control (MAC) control element or Downlink control information (DCI).

Optionally, a valid period of the beam indication information may be specifically:

from a moment when the beam indication information is transmitted until the network device notifies other beam indication information or the network device closes the beam indication information; or, K slots specified by the preset rule; or, K slots specified by the preset rule, unless the network device notifies other beam indication information or the network device closes the beam indication information; or, K slots specified by the preset rule, unless other event specified by the preset rule occurs;

where K is a positive integer greater than or equal to 1.

Optionally, the beam indication information in the DCI may be transmitted together with other data scheduling information, or may be separately transmitted on a Physical Downlink Control Channel (PDCCH).

Optionally, the beam indicated by the beam indication information may be one beam or at least two beams. The beam indication processing program is executed by the processor 901 to further implement the following steps:

when the beam indicated by the beam indication information is one beam, determining the one beam as a beam for reception; or, when the beam indicated by the beam indication information is at least two beams, determining a beam specified by the preset rule in the at least two beams, as a beam for reception; or, determining a subsequently indicated beam of the at least two beams as a beam for reception; or, determining a beam specified by the preset rule in the at least two beams, as a beam for reception, until a subsequent indication is received.

Optionally, the subsequently indicated beam may be a specified beam of at least one beam selected in advance from the at least two beams.

Optionally, the beam indication processing program is executed by the processor 901 to further implement the following steps: reporting the terminal capability information and/or the beam measurement report to the network device.

Optionally, the terminal capability information may include at least one of the following information: terminal processing capability information and spatial related information. The beam measurement report may include at least one of the following information: which transmission beams correspond to same terminal receive beams, and which transmission beams correspond to different terminal receive beams.

Optionally, when receiving data and/or reference signal of PDSCH in the current slot, the beam indication processing program is executed by the processor 901 to further implement the following steps:

before decoding DCI of PDCCH in the current slot is completed, determining, the beam indication information that is transmitted in advance by the network device, as the beam indication information to be used currently; or, before decoding DCI of PDCCH in the current slot is completed, determining, beam indication information used by the user equipment in last scheduling of another PDSCH, as the beam indication information to be used currently; or, before decoding DCI of PDCCH in the current slot is completed, determining, beam indication information used by the user equipment in last successful reception of another PDSCH, as the beam indication information to be used currently; or, before decoding DCI of PDCCH in the current slot is completed, determining, beam indication information used by the user equipment for receiving the PDCCH, as the beam indication information to be used currently; or, after decoding DCI of PDCCH in the current slot is completed, when the DCI includes beam indication information for indicating the current slot, determining the beam indication information as the beam indication information to be used currently; or, after decoding DCI of PDCCH in the current slot is completed, when the DCI does not include beam indication information for indicating the current slot, determining, the beam indication information that is transmitted in advance by the network device, as the beam indication information to be used currently; or, after decoding DCI of PDCCH in the current slot is completed, when the DCI does not include beam indication information for indicating the current slot, determining, beam indication information used by the user equipment in last scheduling of another PDSCH, as the beam indication information to be used currently; or, after decoding DCI of PDCCH in the current slot is completed, when the DCI does not include beam indication information for indicating the current slot, determining, beam indication information used by the user equipment for receiving the PDCCH, as the beam indication information to be used currently; or, after decoding DCI of PDCCH in the current slot is completed, when the DCI does not include beam indication information for indicating the current slot, determining, beam indication information used by the user equipment for corresponding symbols before decoding the DCI is completed, as the beam indication information to be used currently.

Optionally, when the DCI does not include beam indication information for indicating the current slot, there is no time interval between the PDCCH and the PDSCH scheduled by the PDCCH; or, when the DCI includes beam indication information for indicating the current slot, there is a time interval between the PDCCH and the PDSCH scheduled by the PDCCH; or, when the DCI includes beam indication information for indicating the current slot and different transmission beams of the network device correspond to different terminal reception beams, there is a time interval between the PDCCH and the PDSCH scheduled by the PDCCH; or, when the DCI includes beam indication information for indicating the current slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the current slot, the beam indication information may be valid only in the current slot, may continue to be valid after the current slot, or may continue to be valid after the current slot in case that the network device successfully receives the correct decoding acknowledgement signal from the physical layer.

Optionally, an interval between reception of the PDSCH in the current slot and the corresponding physical layer's correct decoding acknowledgement/negative signal is less than a preset number of symbols.

Optionally, the beam indication processing program is executed by the processor 901 to further implement the following steps: receiving high layer signaling configuration information transmitted by the network device, where the high layer signaling configuration information is used to implicitly indicate position of De-modulation Reference Signal (DMRS) of the PDSCH in the current slot; receiving data and/or reference signal of the PDSCH according to the determined beam and the position of the DMRS of the PDSCH in the current slot.

Optionally, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

Optionally, when receiving data and/or reference signal of PDSCH in a non-slot scheduling sub-slot in the current slot, the beam indication processing program is executed by the processor 901 to further implement the following steps:

before decoding DCI of PDCCH in the non-slot scheduling sub-slot is completed, determining, the beam indication information corresponding to the current slot, as the beam indication information to be used currently; or, before decoding DCI of PDCCH in the non-slot scheduling sub-slot is completed, determining, the beam indication information used by the user equipment in last non-slot scheduling, as the beam indication information to be used currently; or, before decoding DCI of PDCCH in the non-slot scheduling sub-slot is completed, determining, beam indication information used by the user equipment when the user equipment successfully schedules other PDSCH in the last non-slot scheduling, as the beam indication information to be used currently; or, before decoding DCI of PDCCH in the non-slot scheduling sub-slot is completed, determining, beam indication information used by the user equipment for receiving the PDCCH, as the beam indication information to be used currently; or, after decoding DCI of PDCCH in the non-slot scheduling sub-slot is completed, when the DCI includes beam indication information for indicating the non-slot scheduling sub-slot, determining the beam indication information as the beam indication information to be used currently; or, after decoding DCI of PDCCH in the non-slot scheduling sub-slot is completed, when the DCI does not include beam indication information for indicating the non-slot scheduling sub-slot, determining, the beam indication information corresponding to the current slot, as the beam indication information to be used currently; or, after decoding DCI of PDCCH in the non-slot scheduling sub-slot is completed, when the DCI does not include beam indication information for indicating the non-slot scheduling sub-slot, determining, the beam indication information used by the user equipment in last non-slot scheduling, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for receiving the PDCCH, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for corresponding symbols before decoding the DCI is completed, as the beam indication information to be used currently.

Optionally, the beam indication information corresponding to the current slot may be the beam indication information that is transmitted in advance by the network device or the beam indication information included in DCI of PDCCH in the current slot.

Optionally, when DCI of the PDCCH does not include beam indication information for indicating the non-slot scheduling sub-slot, there is no time interval between the PDCCH and the PDSCH scheduled by the PDCCH; or, when DCI of the PDCCH includes beam indication information for indicating the non-slot scheduling sub-slot, there is a time interval between the PDCCH and the PDSCH scheduled by the PDCCH; or, when DCI of the PDCCH includes beam indication information for indicating the non-slot scheduling sub-slot and different transmission beams of the network device correspond to different terminal reception beams, there is a time interval between the PDCCH and the PDSCH scheduled by the PDCCH; or, when DCI of the PDCCH includes beam indication information for indicating the non-slot scheduling sub-slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the non-slot scheduling sub-slot, the beam indication information may be valid only in the non-slot scheduling sub-slot, may continue to be valid after the non-slot scheduling sub-slot, or may continue to be valid after the non-slot scheduling sub-slot in case that the network device successfully receives the correct decoding acknowledgement signal from the physical layer.

The user equipment 900 can implement various processes implemented by the user equipment in the foregoing embodiment. To avoid repetition, details are not described herein again.

By determining beam indication information to be currently used, determining a beam for reception according to the determined beam indication information and performing receiving according to the determined beam, the user equipment 900 of the embodiment of the present disclosure can reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

Figure 10:
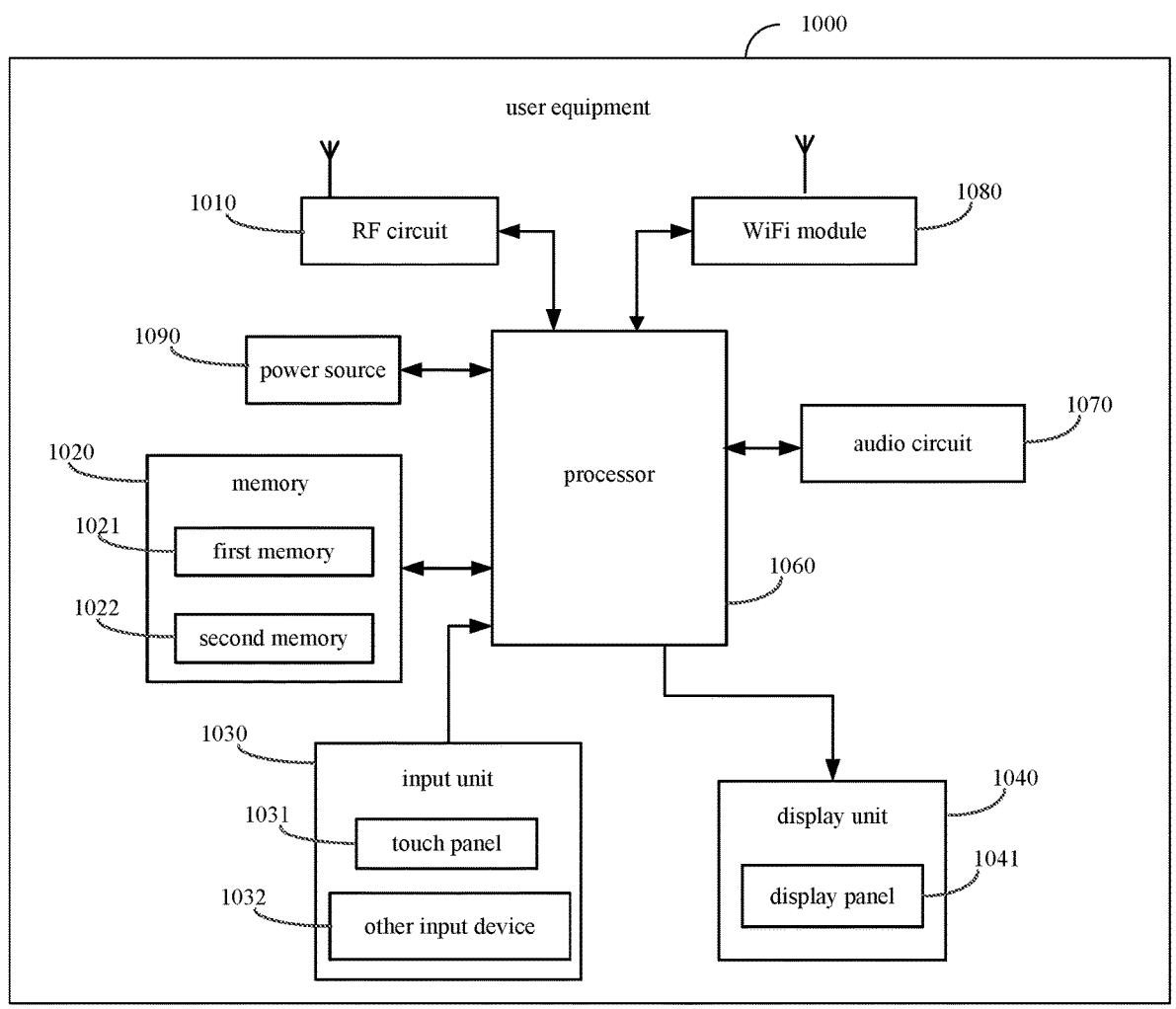
FIG. 10 is a fourth schematic diagram of a user equipment according to an embodiment of the present disclosure.

FIG. 10 is a schematic diagram of a user equipment according to another embodiment of the present disclosure. Specifically, the user equipment 1000 in FIG. 10 may be a mobile phone, a tablet computer, a personal digital assistant (PDA), or an on-board computer.

The user equipment 1000 in FIG. 10 includes a radio frequency (RF) circuit 1010, a memory 1020, an input unit 1030, a display unit 1040, a processor 1060, an audio circuit 1070, a Wireless Fidelity (Wi-Fi) module 1080, and a power source 1090.

The input unit 1030 may be used to receive numeric or character information inputted by a user, and generate an input of signal, which is relevant with user settings and function control of the terminal 1000. Specifically, in the embodiment of the present disclosure, the input unit 1030 may include a touch panel 1031. The touch panel 1031, also referred to as touch screen, may collect touch operations of the user on or around the touch screen (e.g., a user's operations on the touch panel 1031 by using a finger, a touch pen, or any appropriate object or attachment), and drive a corresponding connection device, based on a preset program. Optionally, the touch panel 1031 may include two parts, e.g., a touch detecting device, and a touch controller. The touch detecting device is used to detect a touch direction of a user, detect a signal from a touch operation, and transmit the signal to the touch controller. The touch controller is used to receive touch information from the touch detecting device, convert the touch information to contact coordinates, transmit the contact coordinates to the processor 1060, receive and execute a command from the processor 1060. In addition, the touch panel 1031 may be implemented by various types, such as, resistive, capacitive, infrared, and surface acoustic waves. In addition to the touch panel 1031, the input unit 1030 may also include other input device 1032, which may include, but is not limited to, one or more of a physical keyboard, function keys (such as volume control buttons, switch buttons, etc.), trackball, mouse, joystick, and the like.

The display unit 1040 may be configured to display information inputted by the user, or information provided for the user, and various menu interfaces of the terminal. The display unit 1040 may include a display panel 1041. Optionally, the display panel 1041 may be configured by using LCD, or Organic Light-Emitting Diode (OLED).

It should be noted that, the touch panel 1031 may cover the display panel 1041 to form a touch display. When the touch display detects a touch operation on, or around it, the touch display transmits to the processor 1060, so as to determine the type of the touch event. Subsequently, the processor 1060 provides a corresponding visual output on the touch display based on the type of the touch event.

The touch display includes an application interface display area and a common control display area. Arrangements of the application interface display area and common control display area are not limited, which may be two display areas, such as, up and down, left and right. The application interface display area may be used to display an application interface. Each interface may include interface elements, such as, an icon of at least one application, and/or, widget desktop control, and so on. The application interface display area may also be an empty interface without any content. The common control display area is configured to display highly used controls, e.g., application icons, such as, a setting button, an interface number, a scroll bar, a phone book icon, and so on.

The processor 1060 is a control center of the user equipment 1000. The processor 1060 connects each part of the whole mobile phone, by using various interfaces and lines. The processor 1060 performs various functions of the user equipment 1000, and processes data, by running or executing software programs, and/or, modules in the first memory 1021, and calls data in the second memory 1022, so as to perform an overall monitor on the user equipment 1000. Optionally, the processor 1060 may include one or more processing units.

In the embodiment of the present disclosure, the user equipment 1000 further includes a beam indication processing program stored on the memory 1020 and executable on the processor 1060. The beam indication processing program is executed by the processor 1060 to implement the following steps: determining beam indication information to be currently used; determining a beam for reception according to the determined beam indication information; and, performing receiving according to the determined beam.

Optionally, the beam indication processing program is executed by the processor 1060 to implement the following steps: obtaining the beam indication information that is transmitted in advance by the network device through Media Access Control (MAC) control element or Downlink control information (DCI).

Optionally, a valid period of the beam indication information may be specifically:

from a moment when the beam indication information is transmitted until the network device notifies other beam indication information or the network device closes the beam indication information; or, K slots specified by the preset rule; or, K slots specified by the preset rule, unless the network device notifies other beam indication information or the network device closes the beam indication information; or, K slots specified by the preset rule, unless other event specified by the preset rule occurs;

where K is a positive integer greater than or equal to 1.

Optionally, the beam indication information in the DCI may be transmitted together with other data scheduling information, or may be separately transmitted on a Physical Downlink Control Channel (PDCCH).

Optionally, the beam indicated by the beam indication information may be one beam or at least two beams. The beam indication processing program is executed by the processor 1060 to further implement the following steps: when the beam indicated by the beam indication information is one beam, determining the one beam as a beam for reception; or, when the beam indicated by the beam indication information is at least two beams, determining a beam specified by the preset rule in the at least two beams, as a beam for reception; or, determining a subsequently indicated beam of the at least two beams as a beam for reception; or, determining a beam specified by the preset rule in the at least two beams, as a beam for reception, until a subsequent indication is received.

Optionally, the subsequently indicated beam may be a specified beam of at least one beam selected in advance from the at least two beams.

Optionally, the beam indication processing program is executed by the processor 1060 to further implement the following steps: reporting the terminal capability information and/or the beam measurement report to the network device.

Optionally, the terminal capability information may include at least one of the following information: terminal processing capability information and spatial related information. The beam measurement report may include at least one of the following information: which transmission beams correspond to same terminal receive beams, and which transmission beams correspond to different terminal receive beams.

Optionally, when receiving data and/or reference signal of PDSCH in the current slot, the beam indication processing program is executed by the processor 1060 to further implement the following steps:

before decoding DCI of PDCCH in the current slot is completed, determining, the beam indication information that is transmitted in advance by the network device, as the beam indication information to be used currently; or, before decoding DCI of PDCCH in the current slot is completed, determining, beam indication information used by the user equipment in last scheduling of another PDSCH, as the beam indication information to be used currently; or, before decoding DCI of PDCCH in the current slot is completed, determining, beam indication information used by the user equipment in last successful reception of another PDSCH, as the beam indication information to be used currently; or, before decoding DCI of PDCCH in the current slot is completed, determining, beam indication information used by the user equipment for receiving the PDCCH, as the beam indication information to be used currently; or, after decoding DCI of PDCCH in the current slot is completed, when the DCI includes beam indication information for indicating the current slot, determining the beam indication information as the beam indication information to be used currently; or, after decoding DCI of PDCCH in the current slot is completed, when the DCI does not include beam indication information for indicating the current slot, determining, the beam indication information that is transmitted in advance by the network device, as the beam indication information to be used currently; or, after decoding DCI of PDCCH in the current slot is completed, when the DCI does not include beam indication information for indicating the current slot, determining, beam indication information used by the user equipment in last scheduling of another PDSCH, as the beam indication information to be used currently; or, after decoding DCI of PDCCH in the current slot is completed, when the DCI does not include beam indication information for indicating the current slot, determining, beam indication information used by the user equipment for receiving the PDCCH, as the beam indication information to be used currently; or, after decoding DCI of PDCCH in the current slot is completed, when the DCI does not include beam indication information for indicating the current slot, determining, beam indication information used by the user equipment for corresponding symbols before decoding the DCI is completed, as the beam indication information to be used currently.

Optionally, when the DCI does not include beam indication information for indicating the current slot, there is no time interval between the PDCCH and the PDSCH scheduled by the PDCCH; or, when the DCI includes beam indication information for indicating the current slot, there is a time interval between the PDCCH and the PDSCH scheduled by the PDCCH; or, when the DCI includes beam indication information for indicating the current slot and different transmission beams of the network device correspond to different terminal reception beams, there is a time interval between the PDCCH and the PDSCH scheduled by the PDCCH; or, when the DCI includes beam indication information for indicating the current slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the current slot, the beam indication information may be valid only in the current slot, may continue to be valid after the current slot, or may continue to be valid after the current slot in case that the network device successfully receives the correct decoding acknowledgement signal from the physical layer.

Optionally, an interval between reception of the PDSCH in the current slot and the corresponding physical layer's correct decoding acknowledgement/negative signal is less than a preset number of symbols.

Optionally, the beam indication processing program is executed by the processor 1060 to further implement the following steps: receiving high layer signaling configuration information transmitted by the network device, where the high layer signaling configuration information is used to implicitly indicate position of De-modulation Reference Signal (DMRS) of the PDSCH in the current slot; receiving data and/or reference signal of the PDSCH according to the determined beam and the position of the DMRS of the PDSCH in the current slot.

Optionally, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

Optionally, when receiving data and/or reference signal of PDSCH in a non-slot scheduling sub-slot in the current slot, the beam indication processing program is executed by the processor 1060 to further implement the following steps:

before decoding DCI of PDCCH in the non-slot scheduling sub-slot is completed, determining, the beam indication information corresponding to the current slot, as the beam indication information to be used currently; or, before decoding DCI of PDCCH in the non-slot scheduling sub-slot is completed, determining, the beam indication information used by the user equipment in last non-slot scheduling, as the beam indication information to be used currently; or, before decoding DCI of PDCCH in the non-slot scheduling sub-slot is completed, determining, beam indication information used by the user equipment when the user equipment successfully schedules other PDSCH in the last non-slot scheduling, as the beam indication information to be used currently; or, before decoding DCI of PDCCH in the non-slot scheduling sub-slot is completed, determining, beam indication information used by the user equipment for receiving the PDCCH, as the beam indication information to be used currently; or, after decoding DCI of PDCCH in the non-slot scheduling sub-slot is completed, when the DCI includes beam indication information for indicating the non-slot scheduling sub-slot, determining the beam indication information as the beam indication information to be used currently; or, after decoding DCI of PDCCH in the non-slot scheduling sub-slot is completed, when the DCI does not include beam indication information for indicating the non-slot scheduling sub-slot, determining, the beam indication information corresponding to the current slot, as the beam indication information to be used currently; or, after decoding DCI of PDCCH in the non-slot scheduling sub-slot is completed, when the DCI does not include beam indication information for indicating the non-slot scheduling sub-slot, determining, the beam indication information used by the user equipment in last non-slot scheduling, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for receiving the PDCCH, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for corresponding symbols before decoding the DCI is completed, as the beam indication information to be used currently.

Optionally, the beam indication information corresponding to the current slot may be the beam indication information that is transmitted in advance by the network device or the beam indication information included in DCI of PDCCH in the current slot.

Optionally, when the DCI does not include beam indication information for indicating the non-slot scheduling sub-slot, there is no time interval between the PDCCH and the PDSCH scheduled by the PDCCH; or, when the DCI includes beam indication information for indicating the non-slot scheduling sub-slot, there is a time interval between the PDCCH and the PDSCH scheduled by the PDCCH; or, when the DCI includes beam indication information for indicating the non-slot scheduling sub-slot and different transmission beams of the network device correspond to different terminal reception beams, there is a time interval between the PDCCH and the PDSCH scheduled by the PDCCH; or, when the DCI includes beam indication information for indicating the non-slot scheduling sub-slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the non-slot scheduling sub-slot, the beam indication information may be valid only in the non-slot scheduling sub-slot, may continue to be valid after the non-slot scheduling sub-slot, or may continue to be valid after the non-slot scheduling sub-slot in case that the network device successfully receives the correct decoding acknowledgement signal from the physical layer.

Thus, by determining beam indication information to be currently used, determining a beam for reception according to the determined beam indication information and performing receiving according to the determined beam, the user equipment 1000 of the embodiment of the present disclosure can reasonably select the beam indication information from the network side when receiving, thereby reducing the waste of resources caused by decoding the beam indication information, reducing the requirement on the processing capability of the terminal, and ensuring the capability of data transmission delay and beam dynamic adjustment.

In addition, one embodiment of the present disclosure further provides a network device, including a processor, a memory, and a beam indication processing program stored on the memory and executable on the processor. The beam indication processing program is executed by the processor to implement various procedures of the beam indication processing method which is applied to the network device in the foregoing embodiment, and the same technical effects can be achieved. To avoid repetition, details are not described herein again.

Figure 11:
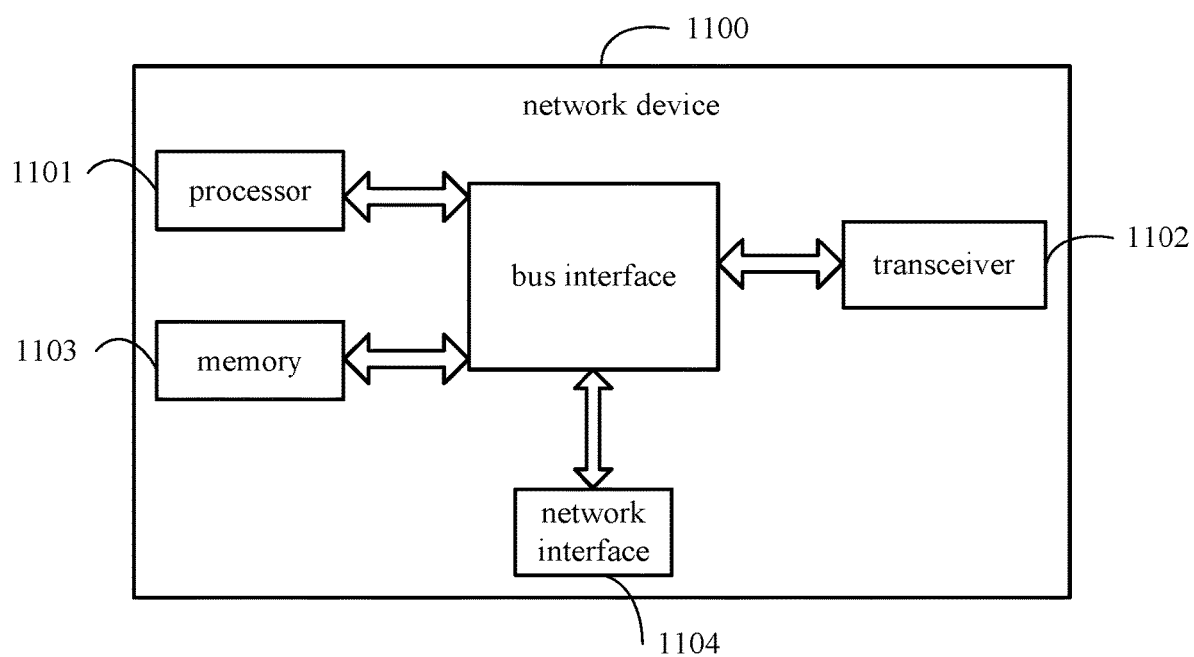
FIG. 11 is a second schematic diagram of a network device according to an embodiment of the present disclosure.

Referring to FIG. 11, FIG. 11 is a schematic diagram of a network device according to an embodiment of the present disclosure, which can implement details of the above beam indication processing method applied to a network device, and achieve the same effect. As shown in FIG. 11, the network device 1100 includes: a processor 1101, a transceiver 1102, a memory 1103, a network interface 1104, and a bus interface.

In one embodiment of the present disclosure, the network device 1100 further includes: a beam indication processing program stored on the memory 1103 and executable on the processor 1101. The beam indication processing program is executed by the processor 1101 to implement the following steps: transmitting beam indication information to a user equipment in advance, and/or, transmitting beam indication information for indicating the current slot to the user equipment by DCI of PDCCH in the current slot, and/or, transmitting beam indication information for indicating non-slot scheduling sub-slot to the user equipment by DCI of PDCCH in the non-slot scheduling sub-slot.

In FIG. 11, a bus architecture may include any number of interconnected buses and bridges. Specifically, various circuits of one or more processors, which are represented by the processor 1101, and the storage, which is represented by the memory 1103, are linked together. The bus architecture may link various other circuits, such as a peripheral device, voltage regulator and a power management circuit together. These features are well known in this field, therefore, this disclosure does not make further description on these features. The bus interface provides an interface. The transceiver 1102 may be multiple elements, including a transmitter and a receiver and provide units, which communicate with other devices on the transmission medium. For different network devices, the network interface 1104 may also be an interface capable of externally/internally connecting required devices, such as a general public wireless interface.

The processor 1101 is responsible for managing the bus architecture and common processing and the memory 1103 may store data used by the processor 1101 when executing the operations.

Optionally, the beam indication processing program is executed by the processor 1101 to implement the following steps: transmitting the beam indication information to the user equipment in advance through MAC control element or DCI.

Optionally, the beam indication processing program is executed by the processor 1101 to implement the following steps: receiving terminal capability information and/or beam measurement report reported by the user equipment.

Optionally, the beam indication processing program is executed by the processor 1101 to implement the following steps: transmitting high layer signaling configuration information to the user equipment; where the high layer signaling configuration information is used to implicitly indicate position of De-modulation Reference Signal (DMRS) of PDSCH in the current slot.

Optionally, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

One embodiment of the present disclosure further provides a computer readable storage medium storing a beam indication processing program. The beam indication processing program is executed by a processor to implement various procedures of the beam indication processing method which is applied to the user equipment or the network device in the foregoing embodiment, and the same technical effects can be achieved. To avoid repetition, details are not described herein again.

Specifically, when the computer-readable storage medium is applied to the user equipment, the beam indication processing program is executed by the processor to implement the following steps: determining beam indication information to be currently used; determining a beam for reception according to the determined beam indication information; performing receiving according to the determined beam.

Optionally, the beam indication processing program is executed by the processor to implement the following steps: obtaining the beam indication information that is transmitted in advance by the network device through Media Access Control (MAC) control element or Downlink control information (DCI).

Optionally, a valid period of the beam indication information transmitted by the network device in advance may be specifically:

from a moment when the beam indication information is transmitted until the network device notifies other beam indication information or the network device closes the beam indication information; or, K slots specified by the preset rule; or, K slots specified by the preset rule, unless the network device notifies other beam indication information or the network device closes the beam indication information; or, K slots specified by the preset rule, unless other event specified by the preset rule occurs;

where K is a positive integer greater than or equal to 1.

Optionally, the beam indication information in the DCI may be transmitted together with other data scheduling information, or may be separately transmitted on a Physical Downlink Control Channel (PDCCH).

Optionally, the beam indicated by the beam indication information may be one beam or at least two beams. The beam indication processing program is executed by the processor to further implement the following steps: when the beam indicated by the beam indication information is one beam, determining the one beam as a beam for reception; or, when the beam indicated by the beam indication information is at least two beams, determining a beam specified by the preset rule in the at least two beams, as a beam for reception; or, determining a subsequently indicated beam of the at least two beams as a beam for reception; or, determining a beam specified by the preset rule in the at least two beams, as a beam for reception, until a subsequent indication is received.

Optionally, the subsequently indicated beam may be a specified beam of at least one beam selected in advance from the at least two beams.

Optionally, the beam indication processing program is executed by the processor to further implement the following steps: reporting the terminal capability information and/or the beam measurement report to the network device.

Optionally, the terminal capability information may include at least one of the following information: terminal processing capability information and spatial related information. The beam measurement report may include at least one of the following information: which transmission beams correspond to same terminal receive beams, and which transmission beams correspond to different terminal receive beams.

Optionally, when receiving data and/or reference signal of PDSCH in the current slot, the beam indication processing program is executed by the processor to further implement the following steps:

before decoding DCI of PDCCH in the current slot is completed, determining, the beam indication information that is transmitted in advance by the network device, as the beam indication information to be used currently; or, before decoding DCI of PDCCH in the current slot is completed, determining, beam indication information used by the user equipment in last scheduling of another PDSCH, as the beam indication information to be used currently; or, before decoding DCI of PDCCH in the current slot is completed, determining, beam indication information used by the user equipment in last successful reception of another PDSCH, as the beam indication information to be used currently; or, before decoding DCI of PDCCH in the current slot is completed, determining, beam indication information used by the user equipment for receiving the PDCCH, as the beam indication information to be used currently; or, after decoding DCI of PDCCH in the current slot is completed, when the DCI includes beam indication information for indicating the current slot, determining the beam indication information as the beam indication information to be used currently; or, after decoding DCI of PDCCH in the current slot is completed, when the DCI does not include beam indication information for indicating the current slot, determining, the beam indication information that is transmitted in advance by the network device, as the beam indication information to be used currently; or, after decoding DCI of PDCCH in the current slot is completed, when the DCI does not include beam indication information for indicating the current slot, determining, beam indication information used by the user equipment in last scheduling of another PDSCH, as the beam indication information to be used currently; or, after decoding DCI of PDCCH in the current slot is completed, when the DCI does not include beam indication information for indicating the current slot, determining, beam indication information used by the user equipment for receiving the PDCCH, as the beam indication information to be used currently; or, after decoding DCI of PDCCH in the current slot is completed, when the DCI does not include beam indication information for indicating the current slot, determining, beam indication information used by the user equipment for corresponding symbols before decoding the DCI is completed, as the beam indication information to be used currently.

Optionally, when the DCI does not include beam indication information for indicating the current slot, there is no time interval between the PDCCH and the PDSCH scheduled by the PDCCH; or, when the DCI includes beam indication information for indicating the current slot, there is a time interval between the PDCCH and the PDSCH scheduled by the PDCCH; or, when the DCI includes beam indication information for indicating the current slot and different transmission beams of the network device correspond to different terminal reception beams, there is a time interval between the PDCCH and the PDSCH scheduled by the PDCCH; or, when the DCI includes beam indication information for indicating the current slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the current slot, the beam indication information may be valid only in the current slot, may continue to be valid after the current slot, or may continue to be valid after the current slot in case that the network device successfully receives the correct decoding acknowledgement signal from the physical layer.

Optionally, an interval between reception of the PDSCH in the current slot and the corresponding physical layer's correct decoding acknowledgement/negative signal is less than a preset number of symbols.

Optionally, the beam indication processing program is executed by the processor to further implement the following steps: receiving high layer signaling configuration information transmitted by the network device, where the high layer signaling configuration information is used to implicitly indicate position of De-modulation Reference Signal (DMRS) of the PDSCH in the current slot; receiving data and/or reference signal of the PDSCH according to the determined beam and the position of the DMRS of the PDSCH in the current slot.

Optionally, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

Optionally, when receiving data and/or reference signal of PDSCH in a non-slot scheduling sub-slot in the current slot, the beam indication processing program is executed by the processor to further implement the following steps:

before decoding DCI of PDCCH in the non-slot scheduling sub-slot is completed, determining, the beam indication information corresponding to the current slot, as the beam indication information to be used currently; or, before decoding DCI of PDCCH in the non-slot scheduling sub-slot is completed, determining, the beam indication information used by the user equipment in last non-slot scheduling, as the beam indication information to be used currently; or, before decoding DCI of PDCCH in the non-slot scheduling sub-slot is completed, determining, beam indication information used by the user equipment when the user equipment successfully schedules other PDSCH in the last non-slot scheduling, as the beam indication information to be used currently; or, before decoding DCI of PDCCH in the non-slot scheduling sub-slot is completed, determining, beam indication information used by the user equipment for receiving the PDCCH, as the beam indication information to be used currently; or, after decoding DCI of PDCCH in the non-slot scheduling sub-slot is completed, when the DCI includes beam indication information for indicating the non-slot scheduling sub-slot, determining the beam indication information as the beam indication information to be used currently; or, after decoding DCI of PDCCH in the non-slot scheduling sub-slot is completed, when the DCI does not include beam indication information for indicating the non-slot scheduling sub-slot, determining, the beam indication information corresponding to the current slot, as the beam indication information to be used currently; or, after decoding DCI of PDCCH in the non-slot scheduling sub-slot is completed, when the DCI does not include beam indication information for indicating the non-slot scheduling sub-slot, determining, the beam indication information used by the user equipment in last non-slot scheduling, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for receiving the PDCCH, as the beam indication information to be used currently; or, after decoding DCI of PDCCH in the non-slot scheduling sub-slot is completed, when the DCI does not include beam indication information for indicating the non-slot scheduling sub-slot, determining, beam indication information used by the user equipment for corresponding symbols before decoding the DCI is completed, as the beam indication information to be used currently.

Optionally, the beam indication information corresponding to the current slot may be the beam indication information that is transmitted in advance by the network device or the beam indication information included in DCI of PDCCH in the current slot.

Optionally, when DCI of the PDCCH does not include beam indication information for indicating the non-slot scheduling sub-slot, there is no time interval between the PDCCH and the PDSCH scheduled by the PDCCH; or, when DCI of the PDCCH includes beam indication information for indicating the non-slot scheduling sub-slot, there is a time interval between the PDCCH and the PDSCH scheduled by the PDCCH; or, when DCI of the PDCCH includes beam indication information for indicating the non-slot scheduling sub-slot and different transmission beams of the network device correspond to different terminal reception beams, there is a time interval between the PDCCH and the PDSCH scheduled by the PDCCH; or, when DCI of the PDCCH includes beam indication information for indicating the non-slot scheduling sub-slot and different transmission beams of the network device correspond to the same terminal reception beam, there is no time interval between the PDCCH and the PDSCH scheduled by the PDCCH.

Optionally, a length of the time interval between the PDCCH and the PDSCH scheduled by the PDCCH may be determined by the network device according to PDCCH decoding time reported by the user equipment.

Optionally, when the DCI includes the beam indication information for indicating the non-slot scheduling sub-slot, the beam indication information may be valid only in the non-slot scheduling sub-slot, may continue to be valid after the non-slot scheduling sub-slot, or may continue to be valid after the non-slot scheduling sub-slot in case that the network device successfully receives the correct decoding acknowledgement signal from the physical layer.

Specifically, when the computer-readable storage medium is applied to the network device, the beam indication processing program is executed by the processor to implement the following steps: transmitting beam indication information to a user equipment in advance, and/or, transmitting beam indication information for indicating the current slot to the user equipment by DCI of PDCCH in the current slot, and/or, transmitting beam indication information for indicating non-slot scheduling sub-slot to the user equipment by DCI of PDCCH in the non-slot scheduling sub-slot.

Optionally, the beam indication processing program is executed by the processor to implement the following steps: transmitting the beam indication information to the user equipment in advance through MAC control element or DCI.

Optionally, the beam indication processing program is executed by the processor to implement the following steps: receiving terminal capability information and/or beam measurement report reported by the user equipment.

Optionally, the beam indication processing program is executed by the processor to implement the following steps: transmitting high layer signaling configuration information to the user equipment; where the high layer signaling configuration information is used to implicitly indicate position of De-modulation Reference Signal (DMRS) of PDSCH in the current slot.

Optionally, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 1 symbol, the position of the DMRS of the PDSCH is at the third symbol in the current slot; or, when the number of symbols corresponding to search space of the PDCCH in the current slot is 1, and an interval between reception of the PDSCH and the corresponding physical layer's correct decoding acknowledgement/negative signal is smaller than a preset number of symbols, and PDCCH decoding capability of the user equipment is within 2 symbols, the position of the DMRS of the PDSCH is at the fourth symbol in the current slot; or, when the number of symbols corresponding to search space of the PDCCH in the current slot is 2, and an interval between reception of the PDSCH and the corresponding physical layer's correct decoding acknowledgement/negative signal is smaller than a preset number of symbols, the position of the DMRS of the PDSCH is at the fourth symbol in the current slot.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure. Therefore, the protection scope of the present disclosure shall be subject to the protection scope of the claims.

What is claimed is:

1. A non-transitory computer readable storage medium comprising a beam indication processing program stored thereon; wherein the beam indication processing program is executed by a processor to implement: determining to-be-used beam indication information; determining a beam for reception according to the determined beam indication information; and performing reception according to the determined beam; wherein when determining the to-be-used beam indication information, the beam indication processing program is executed by the processor to implement: obtaining the to-be-used beam indication information that is transmitted by a network device through Downlink control information (DCI); before DCI decoding is completed, determining beam indication information used by the user equipment for receiving a Physical Downlink Control Channel (PDCCH) carrying the DCI as the to-be-used beam indication information; after DCI decoding is completed, when the DCI comprises beam indication information, determining the beam indication information comprised in the DCI as the to-be-used beam indication information; after DCI decoding is completed, when the DCI does not comprise beam indication information, determining the beam indication information used by the user equipment for receiving the PDCCH carrying the DCI as the to-be-used beam indication information.

2. The non-transitory computer readable storage medium according to claim 1, wherein a valid period of the beam indication information is: when the beam indication information in the Media Access Control (MAC) control element or DCI is transmitted in an N-th slot, the beam indication information is valid in a (N+X)-th slot, wherein X is a positive integer greater than or equal to 0; from a moment when the beam indication information is transmitted until the network device notifies other beam indication information or the network device deactivates the beam indication information; or, K slots specified by a preset rule; or, K slots specified by the preset rule, unless the network device notifies other beam indication information or the network device deactivates the beam indication information; or, K slots specified by the preset rule, unless an event specified by the preset rule occurs; where K is a positive integer greater than or equal to 1.

3. The non-transitory computer readable storage medium according to claim 1, wherein the beam indication information in the DCI is transmitted together with other data scheduling information, or is separately transmitted on the Physical Downlink Control Channel (PDCCH).

4. The non-transitory computer readable storage medium according to claim 1, wherein beam(s) indicated by the beam indication information is one beam or at least two beams; when determining the beam for reception according to the determined beam indication information, the beam indication processing program is executed by a processor to implement: when beam(s) indicated by the beam indication information is one beam, determining the one beam as the beam for reception; or, when beam(s) indicated by the beam indication information are at least two beams, determining a beam specified by a preset rule in the at least two beams, as the beam for reception; or, determining a subsequently indicated beam of the at least two beams as the beam for reception; or, determining a beam specified by the preset rule in the at least two beams, as the beam for reception, until a subsequent indication is received.

5. The non-transitory computer readable storage medium according to claim 1, wherein before determining the to-be-used beam indication information, the beam indication processing program is executed by the processor to implement: reporting at least one of terminal capability information or beam measurement report to a network device.

6. The non-transitory computer readable storage medium according to claim 5, wherein the terminal capability information comprises at least one of the following information: terminal processing capability information and spatial related information.

7. The non-transitory computer readable storage medium according to claim 1, wherein when receiving at least one of data or reference signal of physical downlink shared channel (PDSCH) in a current slot and determining the to-be-used beam indication information, the beam indication processing program is executed by the processor to implement: before decoding DCI of PDCCH in the current slot is completed, determining, beam indication information used by the user equipment for receiving the PDCCH carrying the DCI, as the to-be-used beam indication information; or, after decoding DCI of PDCCH in the current slot is completed, when the DCI comprises beam indication information for indicating the current slot, determining the beam indication information comprised in the DCI as the to-be-used beam indication information; or, after decoding DCI of PDCCH in the current slot is completed, when the DCI does not comprise beam indication information for indicating the current slot, determining, beam indication information used by the user equipment for receiving the PDCCH carrying the DCI, as the to-be-used beam indication information.

8. The non-transitory computer readable storage medium according to claim 7, wherein when the DCI does not comprise beam indication information for indicating the current slot, there is no time interval between the PDCCH and PDSCH scheduled by the PDCCH; or, when the DCI comprises beam indication information for indicating the current slot, there is a time interval between the PDCCH and PDSCH scheduled by the PDCCH; or, when the DCI comprises beam indication information for indicating the current slot and different transmission beams of the network device correspond to different terminal reception beams, there is a time interval between the PDCCH and PDSCH scheduled by the PDCCH; or, when the DCI comprises beam indication information for indicating the current slot and different transmission beams of the network device correspond to the same terminal reception beam, there is no time interval between the PDCCH and PDSCH scheduled by the PDCCH; wherein a length of the time interval between the PDCCH and PDSCH scheduled by the PDCCH is determined by the network device according to PDCCH decoding time reported by the user equipment.

9. The non-transitory computer readable storage medium according to claim 7, wherein when the DCI comprises beam indication information for indicating the current slot, the beam indication information is valid only in the current slot, continues to be valid after the current slot, or continues to be valid after the current slot in case that the network device successfully receives a physical layer's correct decoding acknowledgement signal; or, wherein an interval between reception of the PDSCH and a corresponding physical layer's correct decoding acknowledgement/negative signal is less than a preset number of symbols; or, wherein before performing reception according to the determined beam, the beam indication processing program is executed by the processor to implement: receiving high layer signaling configuration information transmitted by the network device, wherein the high layer signaling configuration information is used to implicitly indicate position of De-modulation Reference Signal (DMRS) of PDSCH in the current slot; when performing reception according to the determined beam, the beam indication processing program is executed by the processor to implement: receiving at least one of data or reference signal of the PDSCH according to the determined beam and the position of the DMRS of the PDSCH in the current slot.

10. The non-transitory computer readable storage medium according to claim 7, wherein before performing reception according to the determined beam, the beam indication processing program is executed by the processor to implement: receiving high layer signaling configuration information transmitted by the network device, wherein the high layer signaling configuration information is used to implicitly indicate position of De-modulation Reference Signal (DMRS) of PDSCH in the current slot; when performing reception according to the determined beam, the beam indication processing program is executed by the processor to implement: receiving at least one of data or reference signal of the PDSCH according to the determined beam and the position of the DMRS of the PDSCH in the current slot; wherein when the number of symbols corresponding to search space of the PDCCH is 1, and an interval between reception of the PDSCH and a corresponding physical layer's correct decoding acknowledgement/negative signal is smaller than a preset number of symbols, and PDCCH decoding capability of the user equipment is within 1 symbol, the position of the DMRS of the PDSCH is at a third symbol in the current slot; or, when the number of symbols corresponding to search space of the PDCCH is 1, and an interval between reception of the PDSCH and a corresponding physical layer's correct decoding acknowledgement/negative signal is smaller than a preset number of symbols, and PDCCH decoding capability of the user equipment is within 2 symbols, the position of the DMRS of the PDSCH is at a fourth symbol in the current slot; or, when the number of symbols corresponding to search space of the PDCCH is 2, and an interval between reception of the PDSCH and a corresponding physical layer's correct decoding acknowledgement/negative signal is smaller than a preset number of symbols, the position of the DMRS of the PDSCH is at a fourth symbol in the current slot.

11. The non-transitory computer readable storage medium according to claim 1, wherein when receiving at least one of data or reference signal of PDSCH in a scheduling sub-slot in a current slot, and determining the to-be-used beam indication information, the beam indication processing program is executed by the processor to implement: before decoding DCI of PDCCH in the scheduling sub-slot is completed, determining, beam indication information used by the user equipment for receiving the PDCCH carrying the DCI, as the to-be-used beam indication information; or, after decoding DCI of PDCCH in the scheduling sub-slot is completed, when the DCI comprises beam indication information for indicating the scheduling sub-slot, determining the beam indication information as the to-be-used beam indication information; or, after decoding DCI of PDCCH in the scheduling sub-slot is completed, when the DCI does not comprise beam indication information for indicating the scheduling sub-slot, determining, beam indication information used by the user equipment for receiving the PDCCH carrying the DCI, as the to-be-used beam indication information.

12. The non-transitory computer readable storage medium according to claim 11, wherein the beam indication information corresponding to the current slot is beam indication information that is transmitted by the network device or the beam indication information comprised in the DCI of PDCCH in the current slot.

13. The non-transitory computer readable storage medium according to claim 11, wherein when the DCI does not comprise beam indication information for indicating the scheduling sub-slot, there is no time interval between the PDCCH and PDSCH scheduled by the PDCCH; or, when the DCI comprises beam indication information for indicating the scheduling sub-slot, there is a time interval between the PDCCH and PDSCH scheduled by the PDCCH; or, when the DCI comprises beam indication information for indicating the scheduling sub-slot and different transmission beams of the network device correspond to different terminal reception beams, there is a time interval between the PDCCH and PDSCH scheduled by the PDCCH; or, when the DCI comprises beam indication information for indicating the scheduling sub-slot and different transmission beams of the network device correspond to the same terminal reception beam, there is no time interval between the PDCCH and the PDSCH scheduled by the PDCCH; wherein a length of the time interval between the PDCCH and PDSCH scheduled by the PDCCH is determined by the network device according to PDCCH decoding time reported by the user equipment.

14. The non-transitory computer readable storage medium according to claim 11, wherein when the DCI comprises beam indication information for indicating the scheduling sub-slot, the beam indication information is valid only in the scheduling sub-slot, continues to be valid after the scheduling sub-slot, or continues to be valid after the scheduling sub-slot in case that the network device successfully receives a physical layer's correct decoding acknowledgement signal.

15. The computer readable storage medium according to claim 6, wherein the terminal processing capability information comprises time needed for performing PDCCH reception.

16. A network device comprising: a memory, a processor, and a beam indication processing program stored on the memory and executable on the processor; wherein the beam indication processing program is executed by the processor to implement:
- transmitting beam indication information to a user equipment through Downlink control information (DCI);
- before DCI decoding is completed, determining, beam indication information used by a Physical Downlink Control Channel (PDCCH) carrying the DCI, as the to-be-used beam indication information;
- after decoding is completed, when the DCI comprises beam indication information, determining the beam indication information comprised in the DCI as the to-be-used beam indication information;
- after DCI decoding is completed, when the DCI does not comprise beam indication information, determining, the beam indication information used by the PDCCH carrying the DCI, as the to-be-used beam indication information.

17. The network device according to claim 16, wherein before transmitting the beam indication information to the user equipment, the beam indication processing program is executed by the processor to implement: receiving at least one of terminal capability information or beam measurement report reported by the user equipment.

18. The network device according to claim 16, wherein the beam indication processing program is executed by the processor to implement: transmitting high layer signaling configuration information to the user equipment; wherein the high layer signaling configuration information is used to implicitly indicate position of Demodulation Reference Signal (DMRS) of PDSCH in the current slot.

19. A non-transitory computer readable storage medium comprising a beam indication processing program stored thereon; wherein the beam indication processing program is executed by a processor to implement: transmitting beam indication information to a user equipment through Downlink control information (DCI); before DCI decoding is completed, determining, beam indication information used by a Physical Downlink Control Channel (PDCCH) carrying the DCI, as the to-be-used beam indication information; after DCI decoding is completed, when the DCI comprises beam indication information, determining the beam indication information comprised in the DCI as the to-be-used beam indication information; after DCI decoding is completed, when the DCI does not comprise beam indication information, determining, the beam indication information used by the PDCCH carrying the DCI, as the to-be-used beam indication information.

20. The non-transitory computer readable storage medium according to claim 19, wherein before transmitting the beam indication information to the user equipment, the beam indication processing program is executed by the processor to implement: receiving at least one of terminal capability information or beam measurement report reported by the user equipment; or, the beam indication processing program is executed by the processor to implement: transmitting high layer signaling configuration information to the user equipment; wherein the high layer signaling configuration information is used to implicitly indicate position of De-modulation Reference Signal (DMRS) of PDSCH in the current slot.

* * * * *